(12) United States Patent
Manabe et al.

(10) Patent No.: US 6,371,666 B1
(45) Date of Patent: Apr. 16, 2002

(54) CAMERA HAVING A SAFETY LOCK MECHANISM

(75) Inventors: Mitsuo Manabe; Toru Ito, both of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/671,798

(22) Filed: Sep. 28, 2000

(30) Foreign Application Priority Data

Sep. 30, 1999 (JP) ............................................ 11-280317
Jul. 6, 2000 (JP) ........................................ 2000-204611

(51) Int. Cl.$^7$ .............................. G03B 1/00; G03B 17/02
(52) U.S. Cl. ...................... 396/411; 396/413; 396/536; 396/538
(58) Field of Search ................................. 396/536, 535, 396/538, 413, 411, 414, 511, 512, 514

(56) References Cited

U.S. PATENT DOCUMENTS

| 5,481,325 | A | * | 1/1996 | Wada et al. | 396/538 |
| 5,646,711 | A | * | 7/1997 | Kitazawa et al. | 396/413 |
| 5,752,118 | A | * | 5/1998 | Lai | 396/513 |
| 5,933,672 | A | * | 8/1999 | Huang | 396/536 |
| 6,050,730 | A | * | 4/2000 | Tanaka et al. | 396/411 |
| 6,101,340 | A | * | 8/2000 | Kojima et al. | 396/536 |
| 6,160,966 | A | * | 12/2000 | Haraguchi | 396/538 |

FOREIGN PATENT DOCUMENTS

| JP | 2-21634 | 2/1990 |
| JP | 5-232560 | 9/1993 |
| JP | 7-199305 | 8/1995 |
| JP | 8-062685 | 3/1996 |
| JP | 11-024159 | 1/1999 |

* cited by examiner

*Primary Examiner*—David M. Gray
(74) *Attorney, Agent, or Firm*—Young & Thompson

(57) ABSTRACT

A hook of a cartridge-chamber lid is engaged with one end of an engagement lever to be kept in a closed position. The other end of the engagement lever is engaged with an intermediate lever attached to an upper face of a cartridge chamber. When a photo film is wound up, a winding-up lock mechanism comprising an urging gear, a lever member and a winding-up lock member prevents the intermediate lever from rotating, namely prevents the engagement lever from swinging to lock the cartridge-chamber lid. When the photo film is rewound, a rewinding lock mechanism comprising an urging gear, a lever member, a rewinding lock member and a torsion spring prevents the intermediate lever from rotating, namely prevents the engagement lever from swinging to lock the cartridge-chamber lid.

18 Claims, 19 Drawing Sheets

CAMERA HAVING A SAFETY LOCK MECHANISM

BACKGROUND OF THE INVENTION

1. Field of the Invention

The present invention relates to a camera, and more particularly to a camera having a safety lock mechanism for locking a lid of a cartridge chamber.

2. Description of the Related Art

Various kinds of photo film cartridges called as the IX-240 type are put on the market. As to such photo film cartridge, a photo film having a smaller picture size are contained, up to its leading edge, in a cartridge body which is smaller than a film cassette of the 135 type. This film cartridge has a film advancing mechanism and a light shielding lid incorporated therein. The film advancing mechanism advances the photo film through a film mouth by rotating a spool. The light shielding lid opens and closes the film mouth.

Moreover, in the photo film cartridge of the IX-240 type, is incorporated an indication mechanism for indicating a usage state of the contained photo film. This indication mechanism comprises four openings and an indication plate. The four openings are formed in an edge face of the cartridge body and have different shapes. The indication plate is integrally rotated with the spool behind the openings. Usage states of an unused state, a halfway state, an exposed state and a developed state are assigned to the respective openings. The usage state corresponding to the opening through which the indication plate is visible is adapted to represent the current usage state of the photo film. With respect to the indication mechanism for the usage state, setting the indication is performed such that after the whole photo film has been rewound in the cartridge body, the spool is successively rotated in a film rewinding direction to control a stop position of the spool. In other words, a camera loaded with the above-noted photo film cartridge includes a usage-state setting mechanism for carrying out a VEI (Visual Exposure Indicate) process. In the VEI process, the spool is successively rotated in the rewinding direction after rewinding the whole photo film into the cartridge body, and then, the usage-state indication plate is set to a position corresponding to the usage state of the cartridge.

On the other hand, various cameras using the photo film cartridge of the IX-240 type are sold. Such camera comprises a cartridge chamber for containing the photo film cartridge, a cartridge-chamber lid for opening and closing the cartridge chamber, a chamber-lid operation mechanism for operating the cartridge-chamber lid, and a safety lock mechanism for locking the chamber-lid operation mechanism. Further, the camera comprises an advancement mechanism for advancing the photo film by rotating a spool of a cartridge body contained in the cartridge chamber, and a light-shielding-lid operation mechanism for operating the light shielding lid of the cartridge body.

Examples of the above-mentioned safety lock mechanism are described in Japanese Utility Model Laid-Open Publication No. 2-21634 and in Japanese Patent Laid-Open Publication Nos. 5-232560 and 7-199305 (counterpart of U.S. Pat. No. 5,600,393). In the above publication No. 2-21634, a lock member is frictionally engaged with a rotational member whose rotational direction at the time of film winding is different from the rotational direction at the time of film rewinding. When the photo film is wound up, the lock member is moved to a lock position where the chamber-lid operation mechanism is locked. When the photo film is rewound, the lock member is moved to a release position where the lock is released. Meanwhile, in the above-noted publication No. 7-199305, it is detected that the photo film is drawn out of the cartridge body, and in accordance with this detection, the chamber-lid operation mechanism is locked. Further, in the above-noted publication No. 5-232560, the lock member for locking the chamber-lid operation mechanism is driven by using an electromagnet.

However, with respect to the safety lock mechanism described in the above-noted publication No. 2-21634, the chamber-lid operation mechanism is not locked at the time of film rewinding so that it is likely to expose the photo film by mistakenly opening the cartridge chamber during the film rewinding. Moreover, if the cartridge-chamber lid is opened when the indication mechanism for indicating the usage state sets the indication of the usage state, there arises a problem in that the wrong indication of the usage state is set.

Regarding the safety lock mechanism described in the above-noted publication No. 7-199305, although the cartridge-chamber lid can be locked when the photo film is rewound, there arises a problem in that a mechanical interlock mechanism becomes large so that downsizing the camera is difficult. Moreover, when the indication of the usage state is set, the photo film is not detected at the outside of the cartridge body. Thus, there arises a problem in that the cartridge-chamber lid is likely to be opened.

Regarding the safety lock mechanism described in the above-noted publication No. 5-232560, there arise problems in that a space for incorporating the electromagnet and an actuator is necessary, and electric power is greatly consumed.

SUMMARY OF THE INVENTION

In view of the foregoing, it is a primary object of the present invention to provide a camera having a safety lock mechanism in which a lid of a cartridge chamber is prevented from being mistakenly opened during a film conveying operation without regard to film winding, film rewinding, and setting by a usage-state indicating mechanism.

It is a second object of the present invention to provide a camera having a safety lock mechanism in which its size is reduced and electric power is not wasted.

It is a third object of the present invention to provide a camera having a safety lock mechanism in which safety lock is released by simple structure without changing an indication of a usage state of a photo film cartridge.

In order to achieve the above and other objects, the camera according to the present invention comprises a winding-up lock mechanism and a rewinding lock mechanism which prevent a lid of a cartridge chamber (hereinafter, cartridge-chamber lid) from being opened.

In a preferred embodiment, a chamber-lid operation mechanism for operating the cartridge-chamber lid includes an operation member, an engagement lever and an intermediate lever. The operation member is slidably attached to a camera body. The engagement lever engages with the operation member and is swung in association therewith to open the cartridge-chamber lid. The intermediate lever is coupled to the engagement lever and abuts on the winding-up lock mechanism and the rewinding lock mechanism. The chamber-lid operation mechanism is changed between a retaining state for keeping the cartridge-chamber lid in a closed position, and a release state for releasing the cartridge-chamber lid.

When a film conveying mechanism starts to wind up a photo film, the winding-up lock mechanism abuts on the intermediate lever to set the chamber-lid operation mechanism in the retaining state. When the film conveying mechanism starts to rewind the photo film, the winding-up lock mechanism is changed not to abut on the intermediate lever so that the chamber-lid operation mechanism is set in the release state.

Meanwhile, when the film conveying mechanism starts to rewind the photo film, the rewinding lock mechanism abuts on the intermediate lever to set the chamber-lid operation mechanism in the retaining state. When the film conveying mechanism starts to wind up the photo film, the rewinding lock mechanism is changed not to abut on the intermediate lever so that the chamber-lid operation mechanism is set in the release state.

Incidentally, when a photo film cartridge is removed from the camera body after rewinding the photo film, both of the winding-up lock mechanism and the rewinding lock mechanism set the chamber-lid operation mechanism in the release state.

In another embodiment, a drive gear and a spool driving member are provided above the intermediate lever. The drive gear is rotated in a forward direction at the time of film winding and is rotated in a reverse direction at the time of film rewinding. The spool driving member is rotated together with the drive gear to rotate a spool of the photo film cartridge in either of a film winding-up direction and a film rewinding direction.

Between the drive gear and the spool driving member, is disposed a press member for keeping them in a non-contact state within a predetermined region. A part of the press member is bent downward so as to press the top of the press member against an upper face of the spool driving member.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
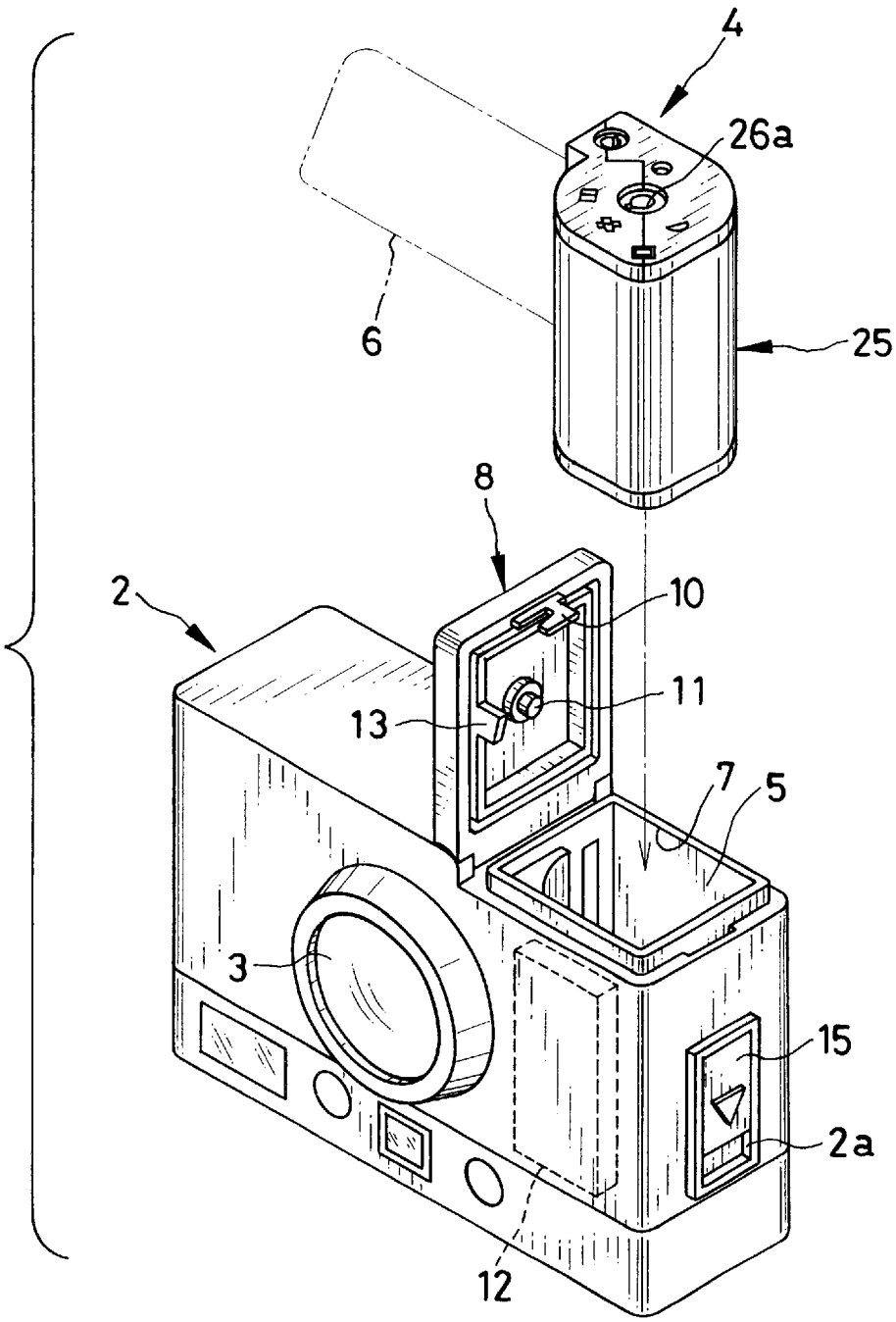
FIG. 1 is a perspective view showing a bottom side of a camera according to the present invention.

FIG. 1 is a perspective view of a bottom side of a camera according to the present invention, which shows a state in that the camera 2 is loaded with a photo film cartridge. A taking lens 3 is incorporated in a central front portion of the camera 2. The inside of the camera 2 is provided with a cartridge chamber 5 and a film chamber (not shown) disposed at both sides of the taking lens 3. The cartridge chamber 5 is for containing a photo film cartridge 4, and the film chamber is for winding-up a photo film 6. An opening 7 of the cartridge chamber 5 is formed at one side of the bottom of the camera 2. The opening 7 is opened and closed by a cartridge-chamber lid 8 of which one side is rotatably attached to the bottom of the camera 2.

The cartridge-chamber lid 8 is retained at a closed position by means of a chamber-lid operation mechanism described later. The inside of the cartridge-chamber lid 8 is provided with a hook 10, a press member 11 and a press segment 13. The hook 10 is retained by the chamber-lid operation mechanism. The press member 11 presses the photo film cartridge 4 toward the inside of the cartridge chamber 5. The press segment 13 presses an eject mechanism 12 to reset it. The eject mechanism 12 pushes the photo film cartridge 4 to the outside of the cartridge chamber 5 so as to easily take out the photo film cartridge 4 when the cartridge-chamber lid 8 is opened.

An operation member 15 constituting the chamber-lid operation mechanism is attached to a side face of the camera 2 being near to the cartridge chamber 5. The operation member 15 is adapted to be slid in a vertical direction within a slit 2a. In a normal state that the cartridge-chamber lid 8 is retained at the closed position, the operation member 15 is positioned at a lower side. When the cartridge-chamber lid 8 is opened, the operation member 15 is slid upward. Upon this, the chamber-lid operation mechanism releases the engagement of the hook 10 to open the cartridge-chamber lid 8.

Figure 2:
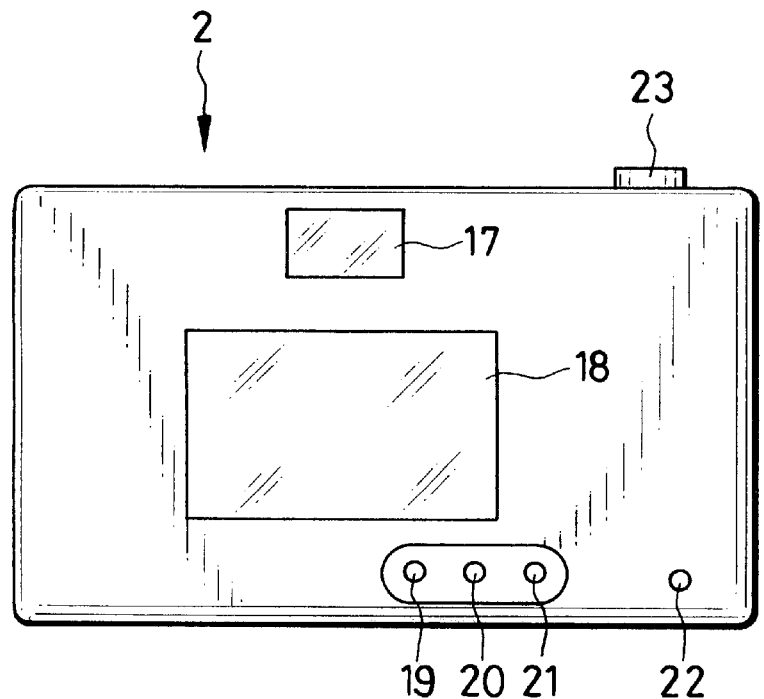
FIG. 2 is a rear view of the camera.

As shown in FIG. 2, a rear face of the camera 2 is provided with a viewfinder window 17 and a liquid crystal display (hereinafter LCD) 18 on which various information are displayed. Under the LCD 18, are arranged a switch button (PQ switch) 19, a switch button (ST switch) 20 and a switch button (rewrite switch) 21 in order from the left. The PQ switch 19 is for assigning a print number and a language of a title. The ST switch 20 is used for setting title words. The rewrite switch 21 is used for changing the title and so forth having been already set. As to the LCD 18, a dot-matrix type is employed. The LCD 18 is controlled by a microcomputer described later, via an LCD control circuit which is not shown.

The camera 2 is provided with a film rewinding switch (MR switch) 22 disposed at a right lower corner of the back thereof. Upon handling the MR switch 22, the photo film 6 is rewound into the cartridge body, even if the whole frames are not exposed. An upper face of the camera 2 is provided with a shutter button 23.

Figure 3:
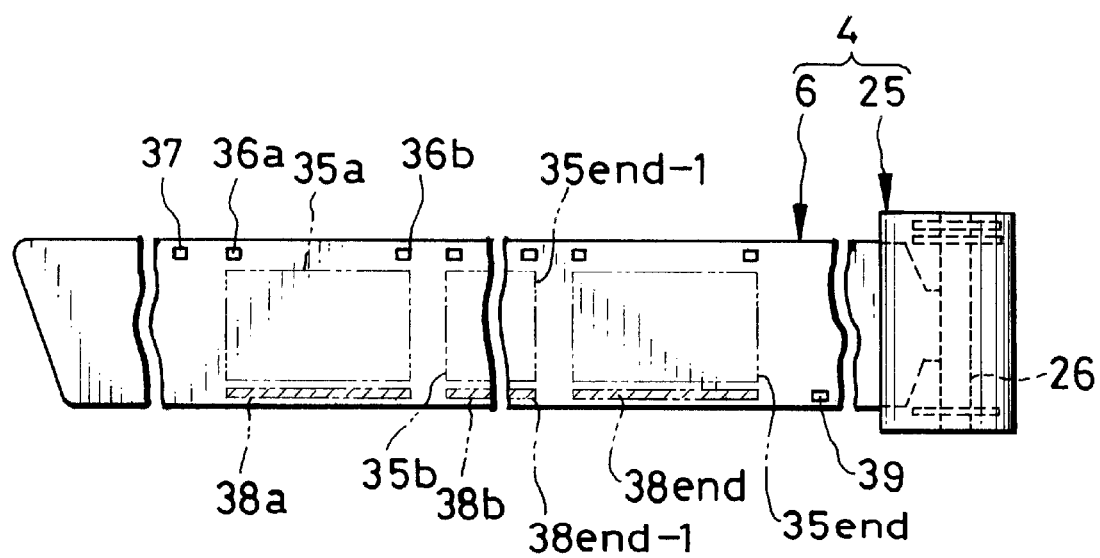
FIG. 3 is a plan view of a photo film cartridge.

As shown in FIG. 3, the photo film cartridge 4 comprises a cartridge body 25 and a photo film 6 contained in the cartridge body 25. A spool 26 around which the photo film 6 is wound is rotatably attached to the inside of the cartridge body 25. Each end of the spool 26 is formed with an engagement hole 26a for engaging with an engagement shaft provide on the camera and so forth. The engagement hole 26a is bared from each end face of the cartridge body 25. Further, the cartridge body 25 has an incorporated film advancement mechanism for advancing the photo film 6 through a film mouth by rotating the spool 26 in a film advancement direction.

Figure 4A:
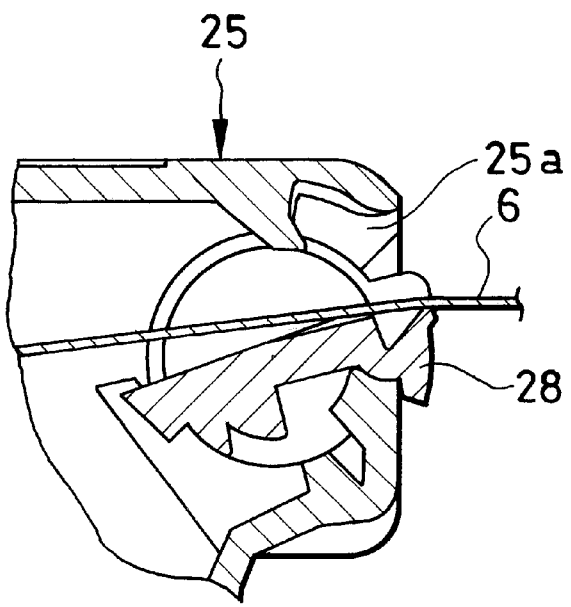
FIGS. 4A and 4B are partially sectional views showing an open state and a closed state of a light shielding lid.
Figure 4B:
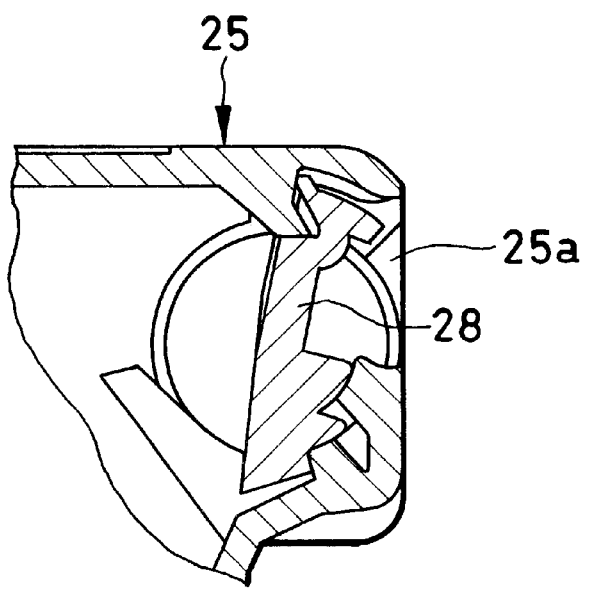
Figure 5A:
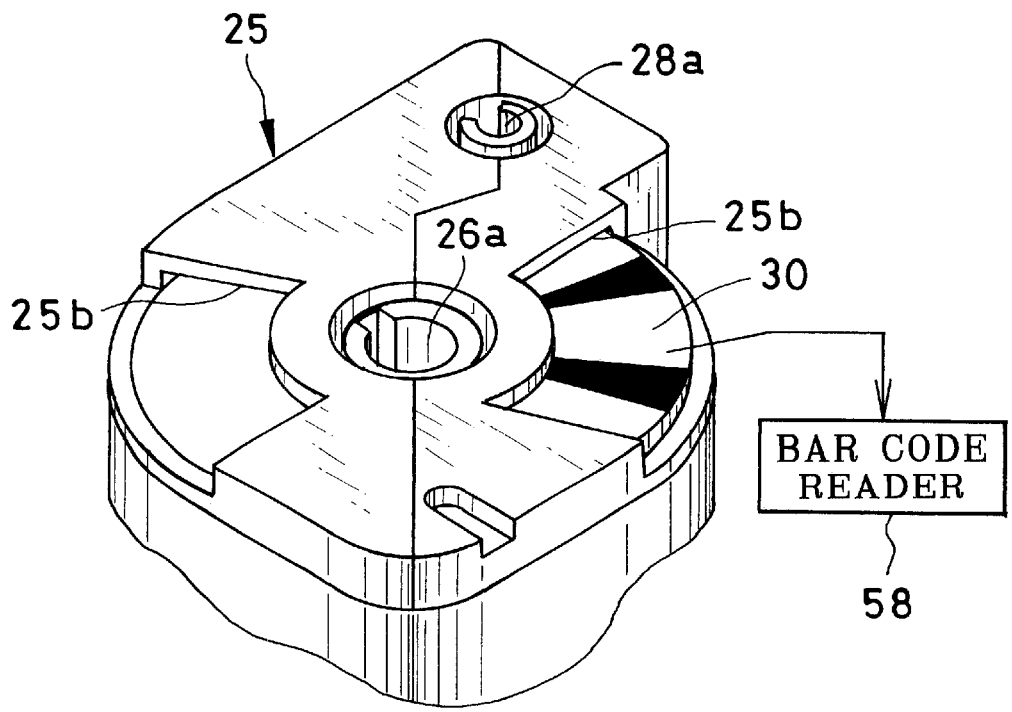
FIG. 5A is a perspective view showing an edge face of a data-disk side of the photo film cartridge.

FIG. 4A is a partially sectional view of the photo film cartridge 4. As shown in FIG. 4A, a light shielding lid 28 is rotatably provided behind the film mouth 25a of the cartridge body 25 to open and close the film mouth 25a. A central portion of the light shielding lid 28 has a plate-like shape. The light shielding lid 28 is rotated between an open position where the film mouth 25a is opened, and a closed position where the film mouth 25a is closed such as shown in FIG. 4B. Meanwhile, as shown in FIG. 5A, the end of the light shielding lid 28 is formed with an engagement hole 28a for engaging with an engagement shaft provided on the camera and so forth. The engagement hole 28a is bared from each end face of the cartridge body 25.

Figure 6:
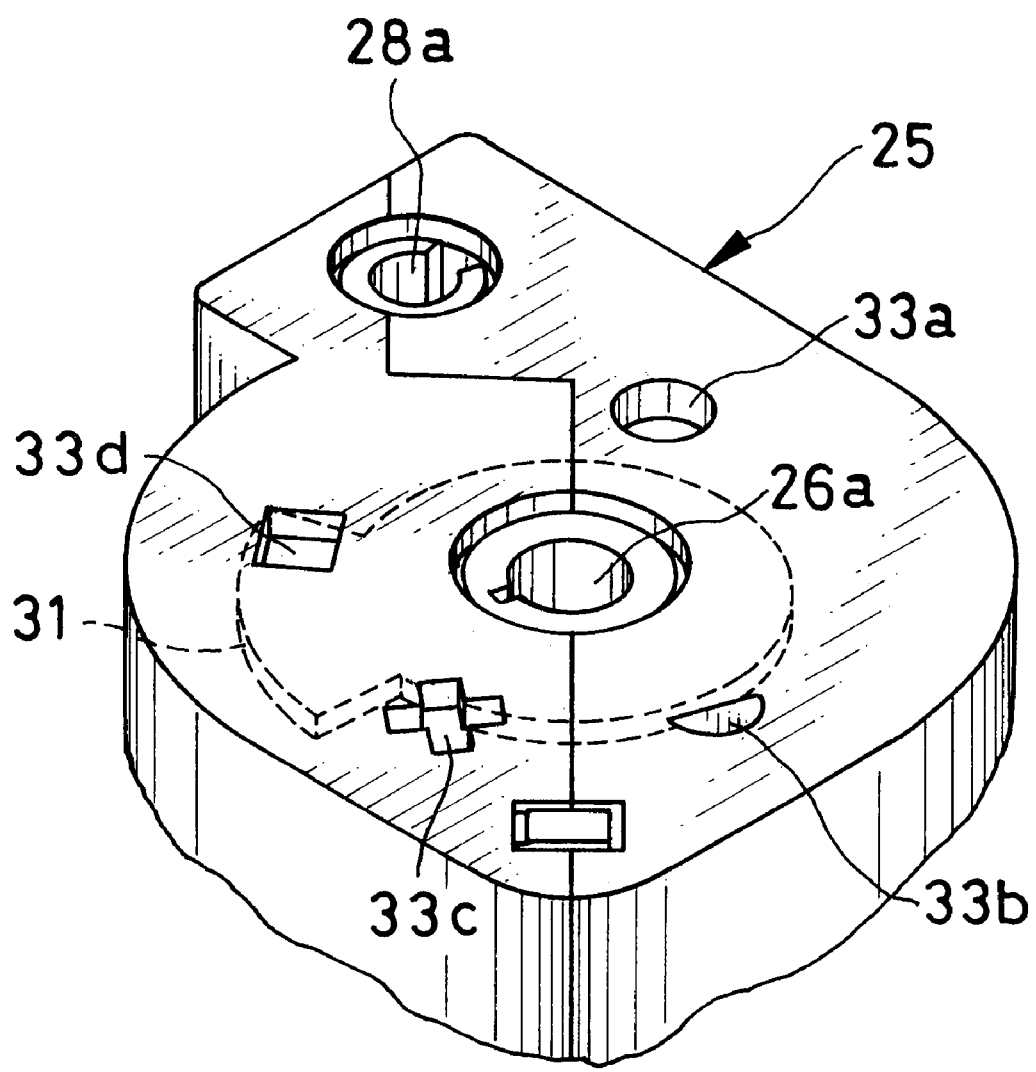
FIG. 6 is a perspective view showing an edge face of an indication-mechanism side of the photo film cartridge.

As shown in FIG. 5A and FIG. 6, a data disk 30 and an indication plate 31 rotating together with the spool 26 are incorporated in the cartridge body 25. The data disk 30 is a disk-shaped member fixed to the end of the spool 26, and on a surface thereof, data are recorded as bar codes. The data relate to a kind, sensitivity, a photographable number and so forth of the photo film 6 contained in the cartridge body 25. The bar code of the data disk 30 is bared through an opening 25b formed in the end face of the cartridge body 25, and is read by a bar code reader 58 incorporated in the camera and so forth.

The indication plate 31 constitutes a mechanism for indicating a usage state of the photo film cartridge 4. The indication plate 31 is a plate member having a sector-like shape, and is fixed to an opposite end of the spool 26, similarly to the data disk 30. The end face of the cartridge body 25 positioned at the side of the indication plate 31 is formed with four indication openings 33a to 33d constituting the usage-state indication mechanism. As to these indication openings, the circular opening 33a represents "unused state", the semicircular opening 33b represents "halfway state", the X-shaped opening 33c represents "exposed state", and the square opening 33d represents "developed state". The usage state of the contained photo film 6 is represented by the indication opening through which the indication plate 31 is observed when the rotation of the spool 26 is stopped.

As shown in FIG. 3, a plurality of exposure frames 35a to 35end are continuously formed on the photo film 6. The end edge of the photo film 6 is retained by the spool 26 of the cartridge body 25. One of side edges of the photo film 6 is formed with perforations 36a and 36b representing a top position and an end position of the respective exposure frames. Further, a perforation 37 is formed in front of the first perforation 36a of the film leader side. This leading perforation 37 is used for controlling a first frame set (FFS), which sets the first frame 35a in a photographable state, when the camera 2 is loaded with the photo film cartridge 4.

The photo film 6 has a well-known photosensitive emulsion layer formed on one face (surface) of its base. On the other face (rear face) of the base, is applied a magnetic material to form a transparent magnetic recording layer. The other side edge of the photo film 6 is provided with magnetic recording sections 38a to 38end so as to correspond to the respective frames 35a to 35end. A magnetic head described later magnetically records exposure control data of the frame, a number of prints, title data and so forth in the magnetic recording section 38a to 38end.

By the way, an auxiliary perforation (turn around perforation) 39 is formed behind the final frame 35end of the photo film 6. This auxiliary perforation 39 is used for mechanically or optically detecting the end of the photo film 6.

Figure 7:
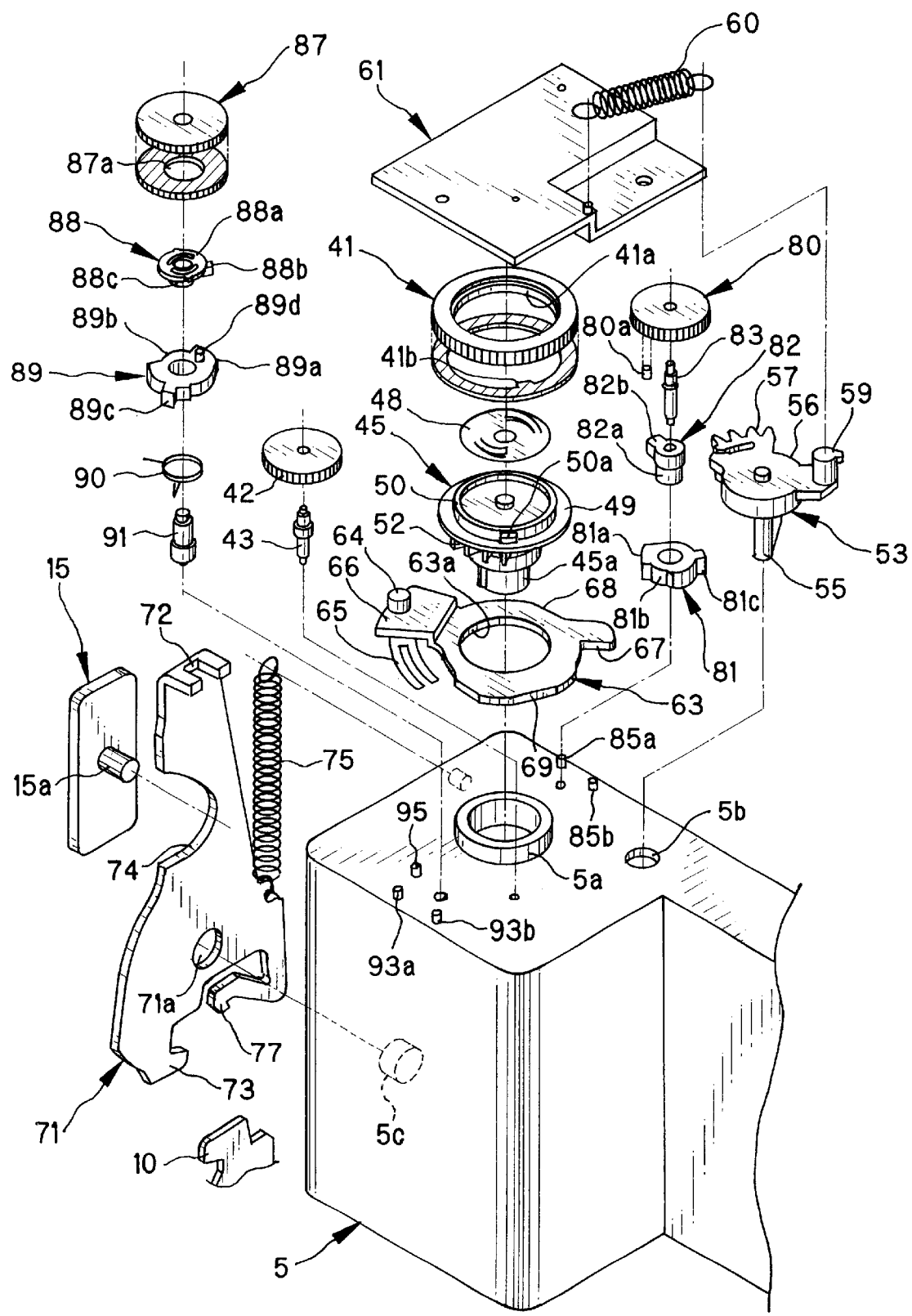
FIG. 7 is an exploded perspective view showing structure of a film conveying mechanism and a safety lock mechanism.
Figure 8:
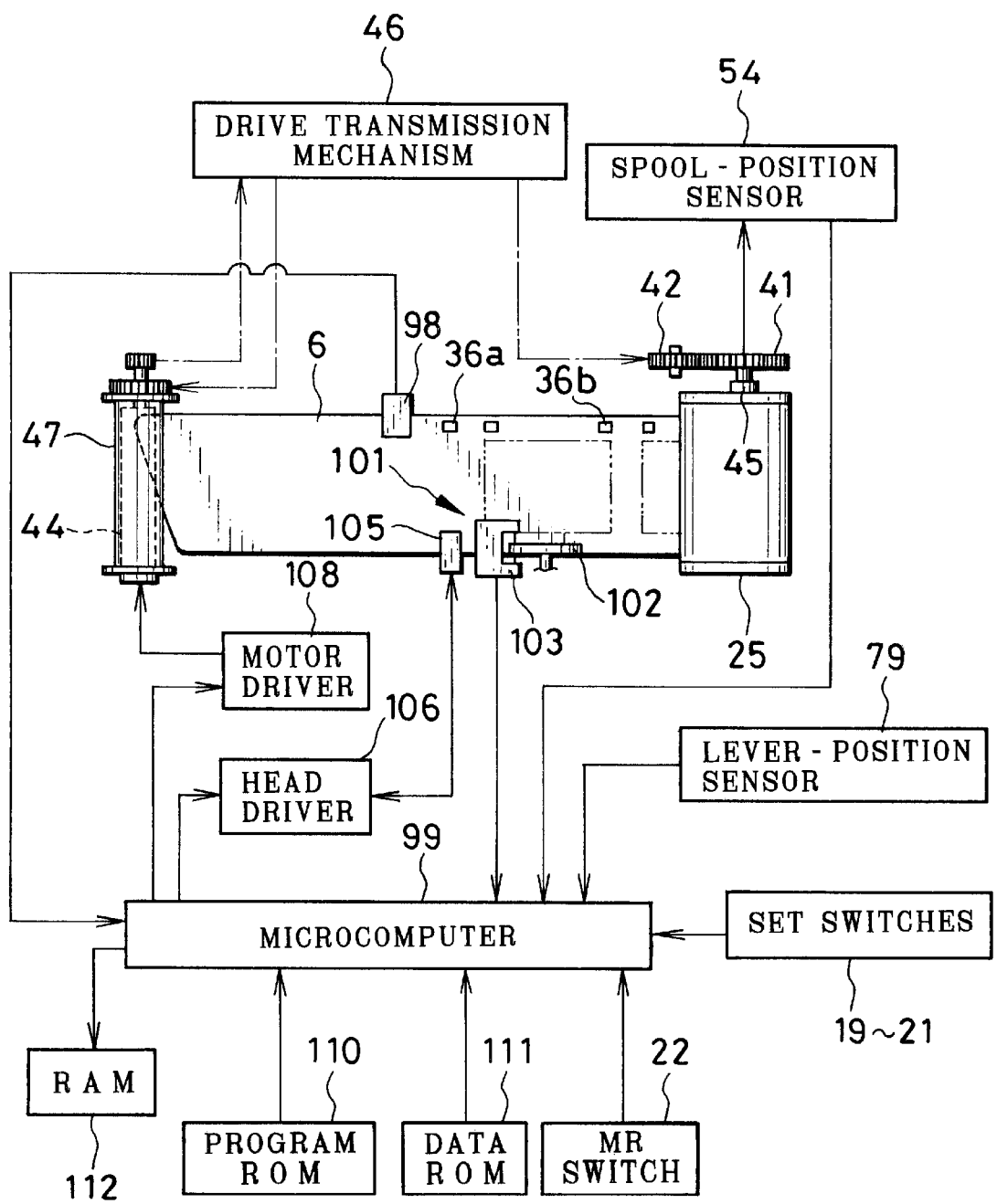
FIG. 8 is a block diagram showing electrical structure of the camera.
Figure 9:
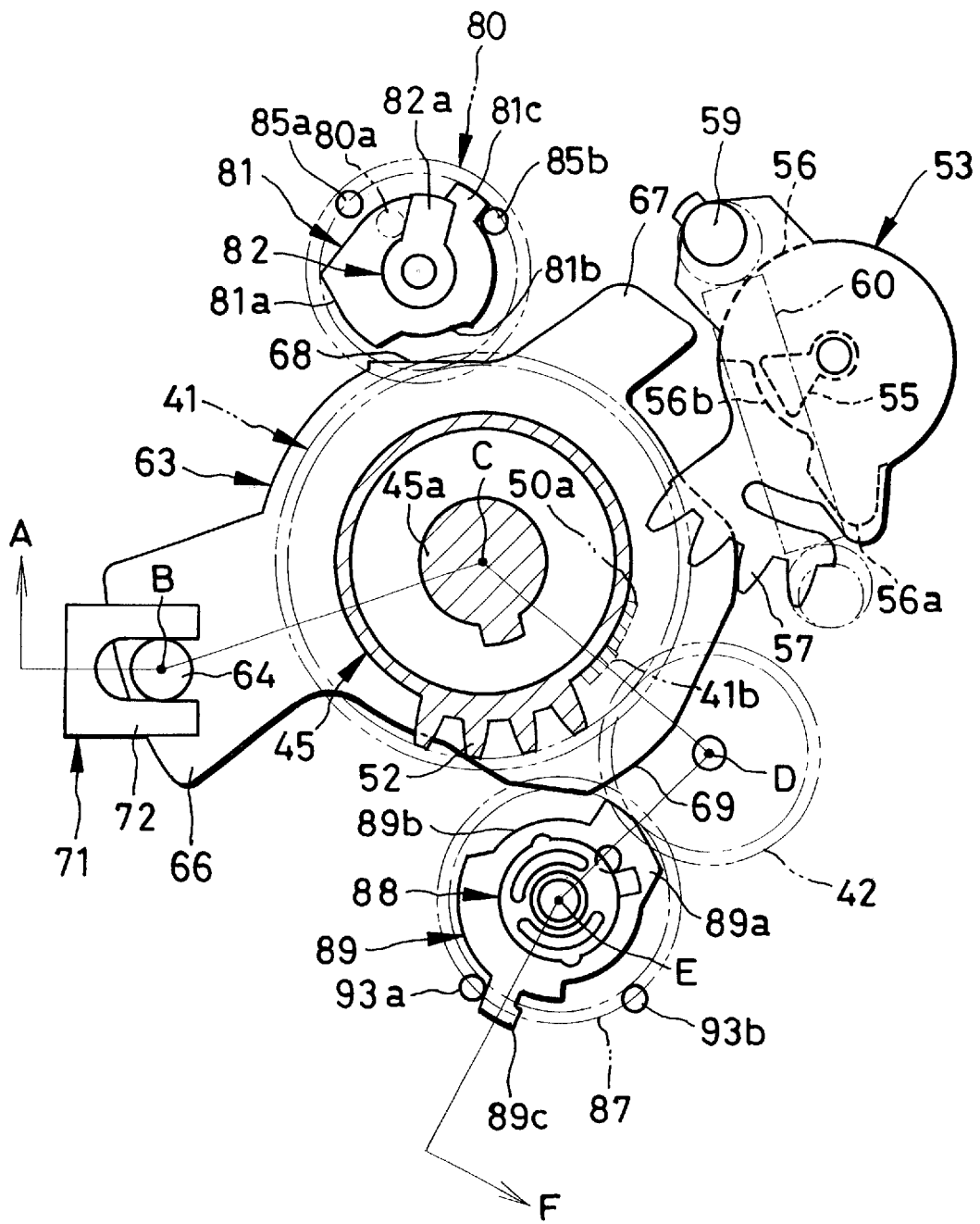
FIG. 9 is a plan view showing an initial state of the safety lock mechanism.
Figure 10:
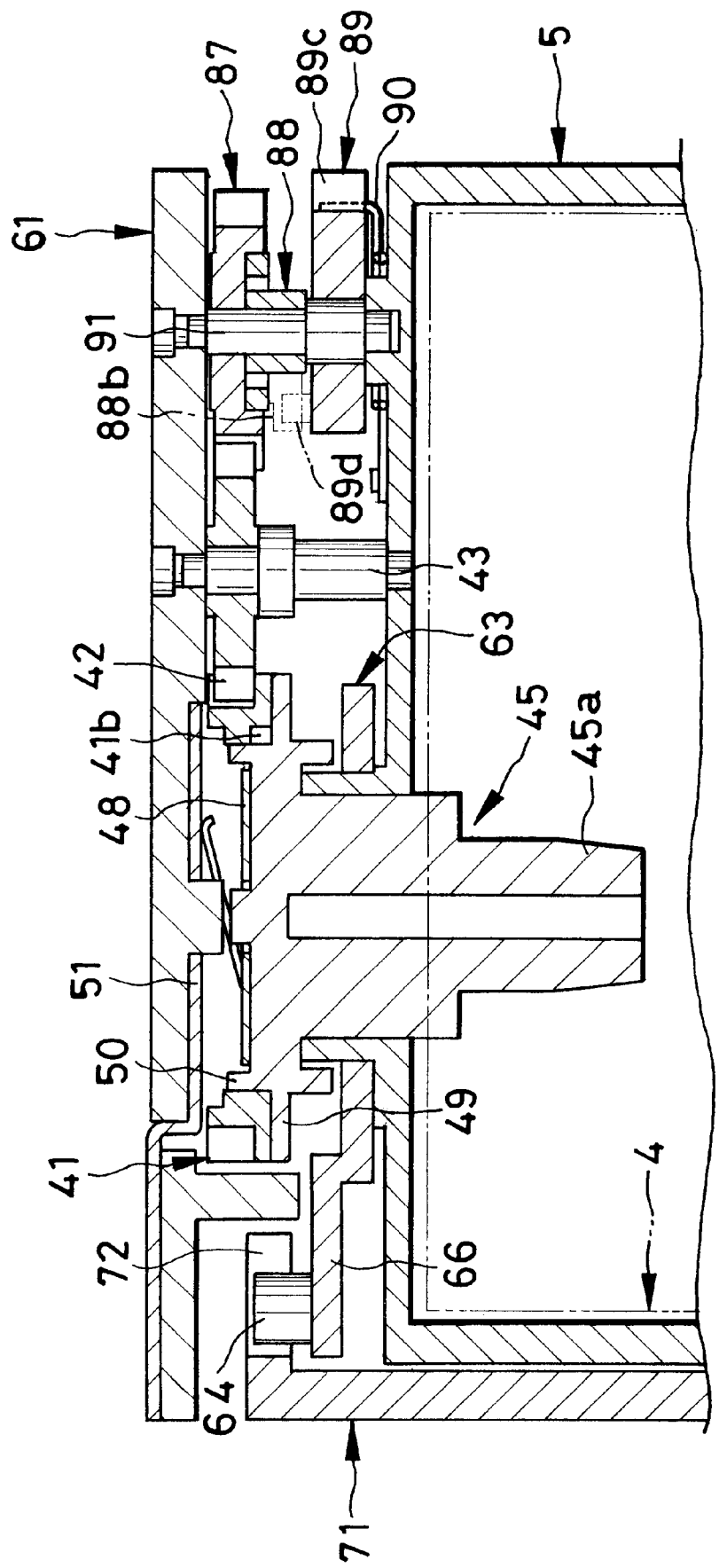
FIG. 10 is a partially sectional view of FIG. 9.

FIG. 7 is an exploded perspective view showing structure of the chamber-lid operation mechanism and a safety lock mechanism for locking the chamber-lid operation mechanism. FIG. 8 is a block diagram showing electrical structure of the camera 2. FIG. 9 is a plan view showing an initial state of the chamber-lid operation mechanism and the safety lock mechanism. FIG. 10 is a section view taken along a line of A–B–C–D–E–F in FIG. 9.

A drive gear 41 and a transmission gear 42 are rotatably attached to an upper face of the cartridge chamber 5. The drive gear 41 constitutes the film conveying mechanism, and the transmission gear 42 transmits a rotation of a motor 44 to the drive gear 41. The transmission gear 42 is supported by a support shaft 43 attached to the upper face of the cartridge chamber 5. The drive gear 41 is supported by a spool driving member 45. The top of the support shaft 43 is supported by a roof plate 61 attached to the upper face of the cartridge chamber 5. The spool driving member 45 is integrally formed with an engagement shaft 45a engaging with the spool 26 of the photo film cartridge 4. The engagement shaft 45a is inserted into a hole formed in a boss 5a of the upper face of the cartridge chamber 5 to project into the cartridge chamber 5.

A drive transmission mechanism 46 constituting the film conveying mechanism and transmitting the rotation of the motor 44 to the transmission gear 42 is provided between the transmission gear 42 and the motor 44 such as shown in FIG. 8. The drive transmission mechanism 46 comprises a plurality of gears for reducing a rotational speed of the motor 44, and an epicyclic gear unit. The motor 44 is incorporated in a winding-up shaft 47 disposed in the film chamber.

Although details are not shown, the epicyclic gear unit comprises a sun gear to which the rotation of the motor 44 is transmitted, and at least two epicyclic gears for meshing with the sun gear. The epicyclic gear revolves around the sun gear in association with a change of a rotational direction of the motor 44. Each of the two epicyclic gears meshes with another gear after revolution. When the photo film is wound up, the rotation of the motor 44 is transmitted to both of the transmission gear 42 and the winding-up shaft 47. When the photo film is rewound, the rotation of the motor 44 is transmitted to only the transmission gear 42.

A clutch mechanism for idling the spool drive member 45 is incorporated between the epicyclic gear and the transmission gear 42. This clutch mechanism absorbs difference between a film winding speed of the winding-up shaft 47 and a film advancement speed of the spool driving member 45 by idling the spool driving member 45. Owing to this, looseness of the photo film 6 is prevented from occurring.

The drive gear 41 has an annular shape and is provided with teeth arranged on a periphery thereof. An upper portion of the spool driving member 45 is formed with a gear holder 49 having a disk shape. An upper face of the gear holder 49 is integrally formed with a support projection 50 having an annular shape. An inside portion 41a of the drive gear 41 engages with a periphery of the support projection 50 so as to be rotatably supported. Moreover, the inside portion 41a of the drive gear 41 is integrally formed with an engaging protrusion 41b projecting toward the inside. Meanwhile, the periphery of the support projection 50 of the spool driving member 45 is formed with an engaged protrusion 50a on which the engaging protrusion 41b of the drive gear 41 abuts.

The engaging protrusion 41b and the engaged protrusion 50a constitute a transmission delay mechanism. The rotation of the drive gear 41 is transmitted to the spool driving member 45 only when the protrusions 41b and 50a abut with each other. Thus, when the rotational direction of the motor 44 is changed, the rotation of the drive gear 41 is transmitted to the spool driving member 45 with a delay.

A brush 48 having a disk shape and formed from a thin metal plate is attached to the top of the spool driving member 45. A printed circuit board 51 having a contact point for contacting the brush 48 is attached to a lower face of the roof plate 61. The brush 48 and the contact point of the printed circuit board 51 constitute a spool-position sensor 54 for detecting a rotational position of the spool driving member 45. The spool-position sensor 54 sets the spool 26 to an initial position when a usage-state detecting process (DEP process) of the photo film cartridge 4 is carried out. Besides this, the detection sensor 54 is used to obtain a stop position of the spool 26 when a usage-state setting process (VEI process) for setting the usage-state indication mechanism is carried out.

A driving gear 52 for driving the light shielding lid 28 is integrally formed under the gear holder 49 of the spool driving member 45. The shielding-lid driving gear 52 comprises a plurality of teeth provided on a periphery thereof, and rotates the light shielding lid 28 from the closed position to the open position when the usage-state detection process (DEP process) and a film-data reading process are performed just after containing the film cartridge 4.

A driving member 53 for driving the light shielding lid 28 comprises an engagement shaft 55 engaging with the engagement hole 28a of the light shielding lid 28, a cam portion 56 integrally formed at an upper portion of the engagement shaft 55, and a gear portion 57 integrally formed with the cam portion 56. The engagement shaft 55 is rotatably inserted into a hole 5b formed in the upper face of the cartridge chamber 5. The engagement shaft 55 projects into the cartridge chamber 5 and engages with the light shielding lid 28 of the photo film cartridge 4. The cam portion 56 is used when the light shielding lid 28 is rotated from the open position to the closed position.

Figure 11:
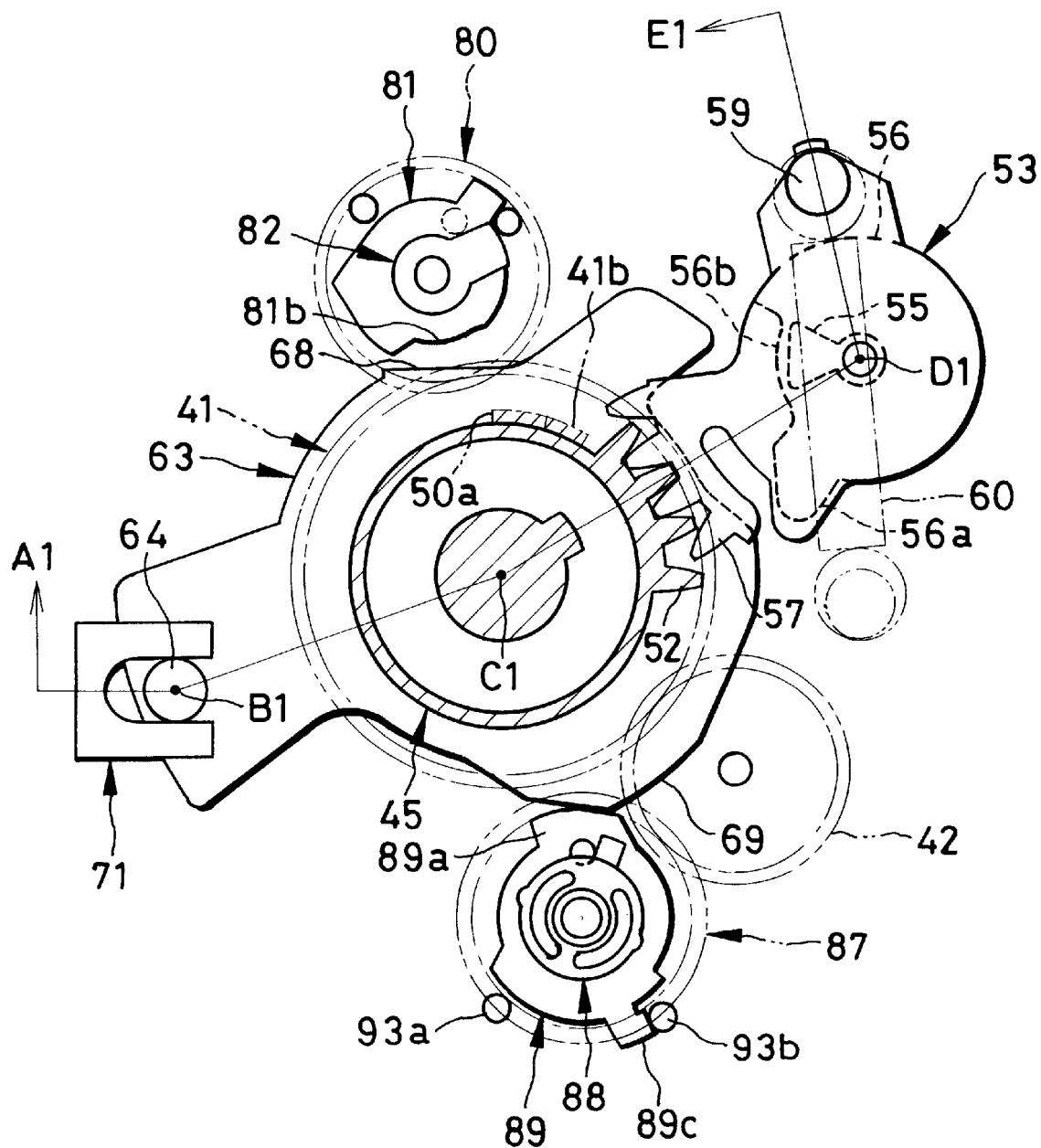
FIG. 11 is a plan view showing a state of the safety lock mechanism at the time of starting a DEP process.
Figure 12:
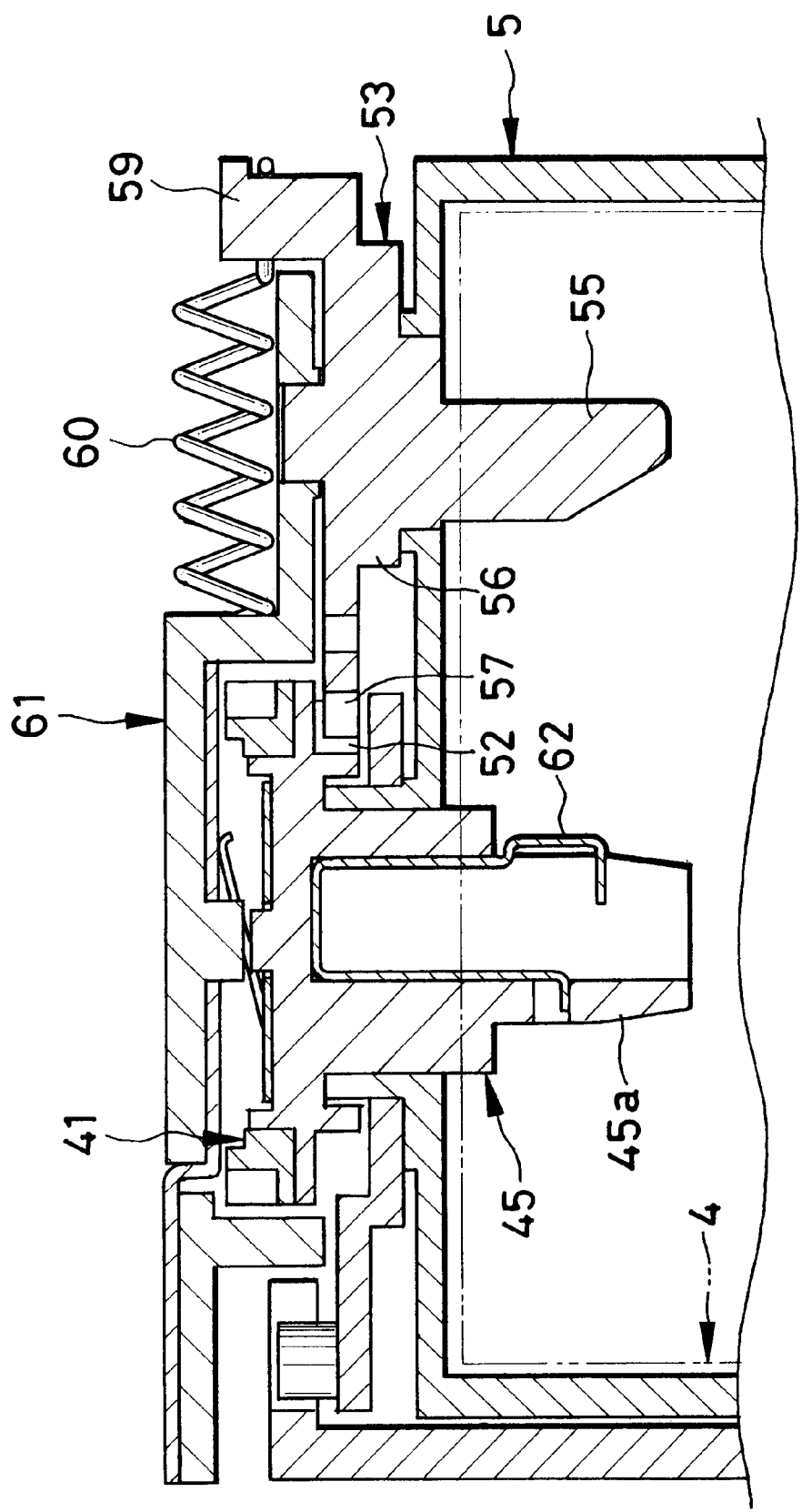
FIG. 12 is a partially sectional view of FIG. 11.

The gear portion 57 of the shielding-lid driving member 53 is constituted of the several teeth. As shown in FIG. 11 and FIG. 12 which is a sectional view taken along a line A1–B1–C1–D1–E1 in FIG. 11, when the spool driving shaft 45 is rotated in a film rewinding direction during the DEP process, the shielding-lid driving gear 52 meshes with the gear portion 57. Owing to this, the shielding-lid driving member 53 is rotated in association with the shielding-lid driving gear 52 to rotate the light shielding lid 28 toward the open position, such as shown in FIG. 4A.

A spring retainer 59 is integrally formed with the cam portion 56. One end of a coiled spring 60 is put on the spring retainer 59, and the other end thereof is put on the roof plate 61. The coiled spring 60 works like a toggle spring to keep the shielding-lid driving member 53 in positions corresponding to the closed position and the open position of the light shielding lid 28. During the rotation of the shielding-lid driving member 53, the coiled spring 60 urges the shielding-lid driving member 53 toward either of the open position and the closed position of the light shielding lid 28 in accordance with a rotational position of the shielding-lid driving member 53.

As shown in FIG. 12, an engagement plate 62 for engaging with a key groove of the engagement hole 26a of the spool 26 is incorporated in an engagement shaft 45a of the spool driving member 45. The engagement plate 62 is formed from a thin metal plate having flexibility. Even if a stop position of the spool 26 of the contained photo film cartridge 4 is different from a stop position of the spool driving member 45, the engagement shaft 45a is adapted to be inserted into the engagement hole 26a by elastic deformation toward the inside of the engagement shaft 45a.

Under the spool driving member 45, a plate-shaped intermediate lever 63 constituting the operation mechanism of the cartridge-chamber lid is rotatably attached to the upper face of the cartridge chamber 5. The intermediate lever 63 comprises an opening 63a into which a boss 5a of the cartridge chamber 5 is inserted, an interlocking lever 66 provided with a pin 64 and a brush 65, a press lever 67 for rotating the light shielding lid 28 to the closed position, a winding-up cam portion 68, and a rewinding cam portion 69. The pin 64 protrudes from the upper face of the interlocking lever 66, and the brush 65 made of a thin metal plate is attached to the lower face of the interlocking lever 66. The winding-up cam portion 68 and the rewinding cam portion 69 are formed around the opening 63a.

The pin 64 of the interlocking lever 66 engages with one end of an engagement lever 71 swingably attached to a side face of the cartridge chamber 5. The engagement lever 71 constitutes the operation mechanism of the cartridge-chamber lid and is a plate member whose cross section has an L-like shape. A pin 5c formed on the side face of the cartridge chamber 5 is inserted into a central hole 71a so as to swingably support the engagement lever 71. Both ends of the engagement lever 71 are respectively formed with an interlocking portion 72 and an engagement portion 73. The interlocking portion 72 has a fork end and engages with the pin 64 of the intermediate lever 63. The engagement portion 73 engages with the hook 10 of the cartridge-chamber lid 8. Between the interlocking portion 72 and the engagement portion 73, are provided a notch 74 for engaging with the operation member 15. The engagement lever 71 is urged by a coiled spring 75 such that the engagement portion 73 is biased toward the hook 10 to engage therewith.

The back of the operation member 15 is integrally formed with a pin 15a for engaging with the notch 74 of the engagement lever 71. The engagement lever 71 is urged by the coiled spring 75 so that the pin 15a is pressed by the notch 74 to locate the operation member 15 at a lower portion in the slit 2a.

Figure 14:
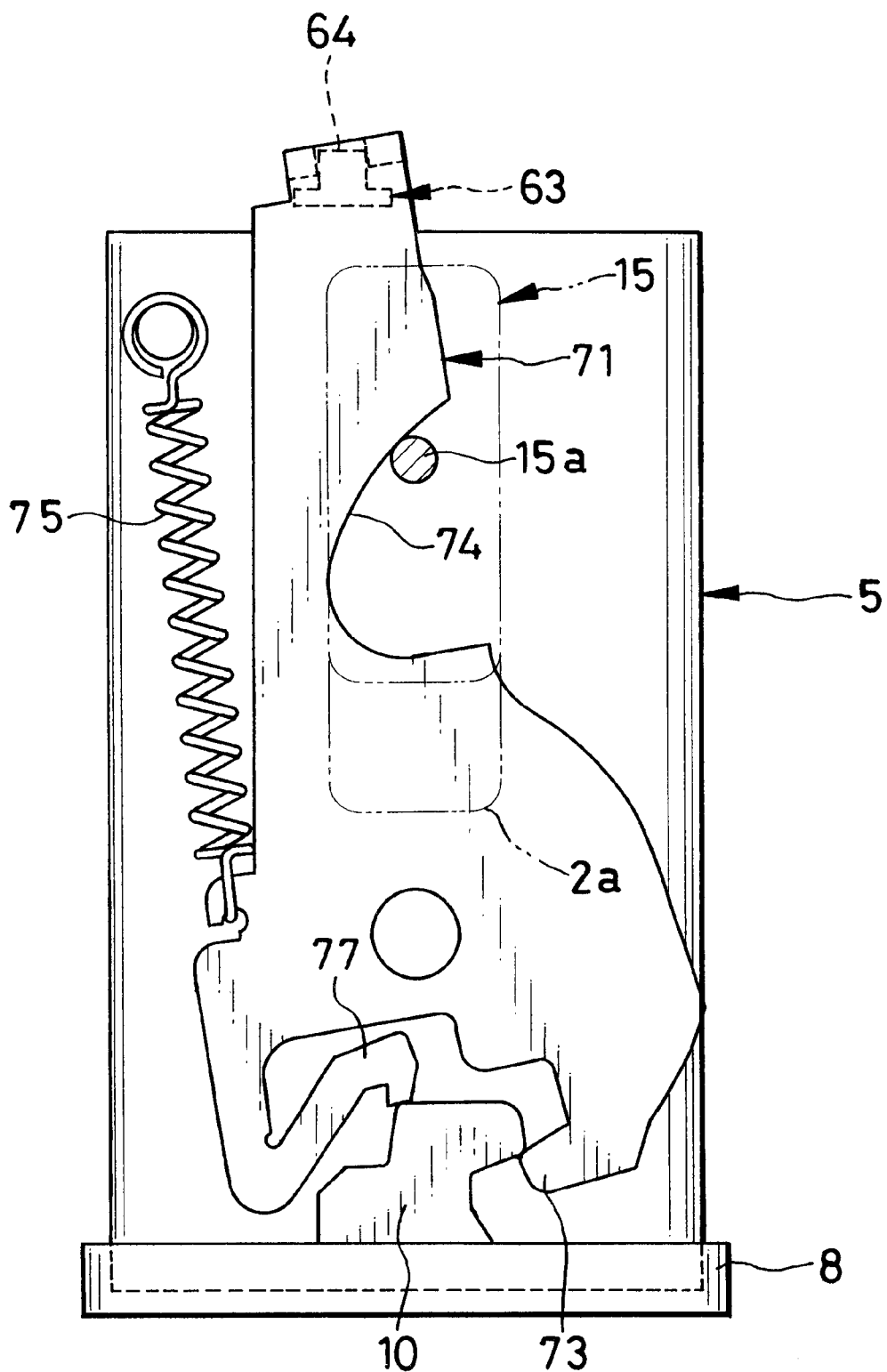
FIG. 14 is a side view showing the structure of the chamber-lid operation mechanism set to a release state.

When the cartridge-chamber lid 8 is opened, the operation member 15 is slid upward such as shown in FIG. 14. Upon this, the pin 15a of the operation member 15 is moved upward to press the notch 74 so that the engagement lever 71 is rotated against the urging force of the coiled spring 75. Consequently, the engagement portion 73 of the engagement lever 71 is released from engaging with the hook 10 of the cartridge-chamber lid 8. Meanwhile, a resilient portion 77 is provided at a side of the engagement portion 73 of the engagement lever 71. The resilient portion 77 abuts on the hook 10 to press it. Owing to this, when the engagement portion 73 is released from engaging with the hook 10, the cartridge-chamber lid 8 is slightly opened.

The brush 65 attached to the lower face of the interlocking lever 66 comes into contact with a printed circuit board (not shown) attached to the upper face of the cartridge chamber 5. The printed circuit board is formed with a plurality of contact points for contacting with the brush 65. The brush 65 and the contact points constitute a lever-position sensor 79 for detecting a rotational position of the intermediate lever 63. In virtue of this, an operational state of the cartridge-chamber lid 8 can be detected on the basis of the rotational position of the intermediate lever 63.

Figure 15:
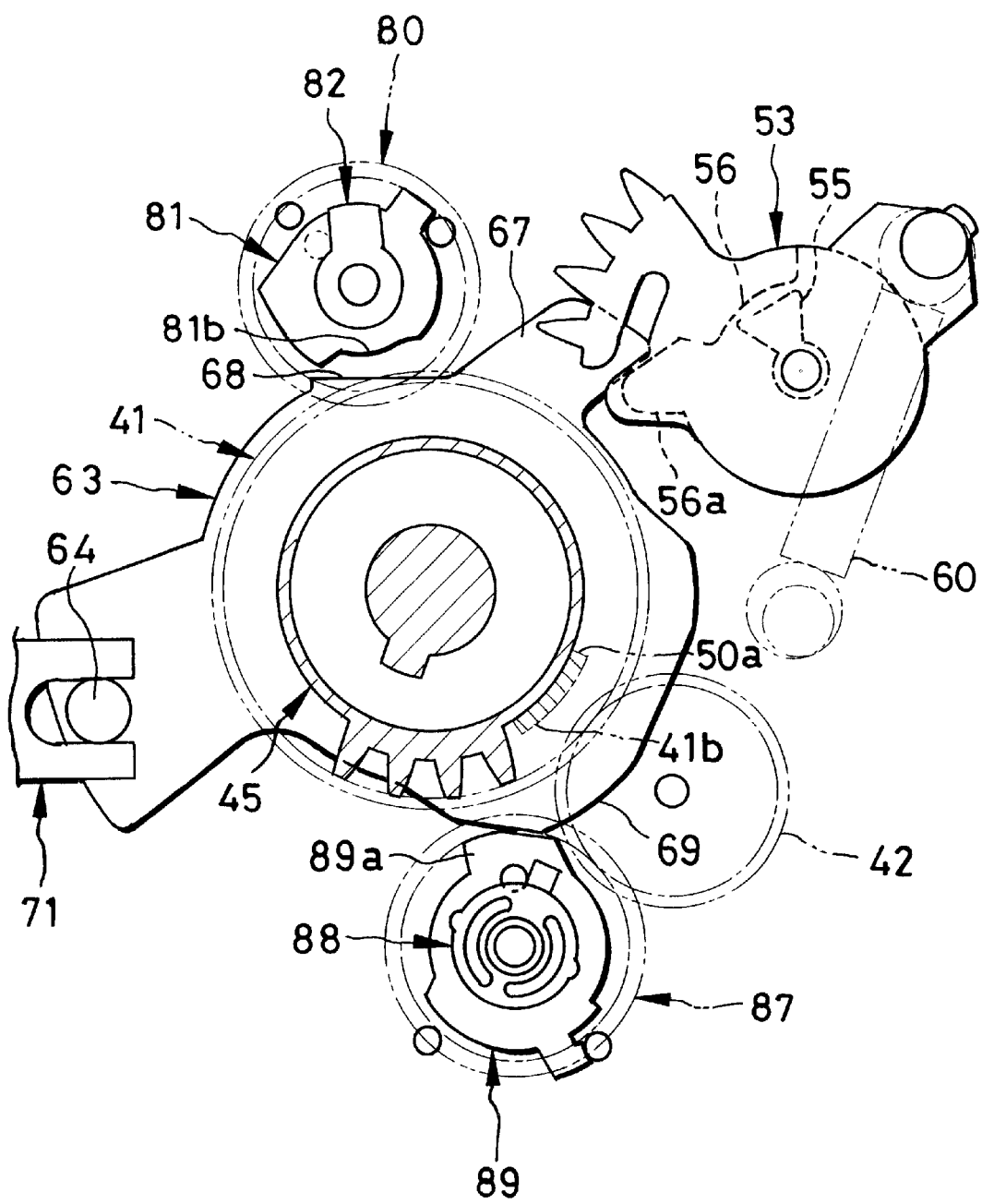
FIG. 15 is a plan view showing a state of the safety lock mechanism at the end of the DEP process.

As shown in FIG. 15, under a state in that the light shielding lid 28 of the photo film cartridge 4 is opened, the press lever 67 of the intermediate lever 63 confronts the cam portion 56 of the shielding-lid driving member 53. Thus, when the cartridge-chamber lid 8 is opened by an opening operation of the operation member 15, the press lever 67 presses the cam portion 56 to rotate the shielding-lid driving member 53 toward the closed position of the light shielding lid 28. In this way, the light shielding lid 28 is securely closed when the cartridge-chamber lid 8 is opened. Accordingly, the photo film 6 is not exposed.

A winding-up lock mechanism and a rewinding lock mechanism are incorporated near the drive gear 41. The winding-up lock mechanism is constituted of an urging gear 80, a winding-up lock member 81, and a lever 82 incorporated between them. The urging gear 80, the winding-up lock member 81 and the lever 82 are rotatably supported by a support shaft 83.

The urging gear 80 is a rotary member meshing with the drive gear 41 and rotated in association therewith. A lower face of the urging gear 80 is integrally formed with a pin 80a abutting on the lever 82. The winding-up lock member 81 has a disk-like shape, and a periphery thereof is formed with a projecting lock section 81a, a rotation permitting section 81b having a notch shape, and a regulating section 81c having a protrusion shape. A part of the upper face of the cartridge chamber 5 to which the winding-up lock member 81 is attached is provided with regulation pins 85a and 85b which abut on the regulating section 81c to restrict a rotational area of the winding-up lock member 81.

Rotational force is transmitted between the urging gear 80 and the winding-up lock member 81 by means of the pin 80a of the urging gear 80 and the lever 82. The lever 82 comprises an insertion section 82a and a lever section 82b. The insertion section 82a has a cylindrical shape and is tightly inserted into a hole of the winding-up lock member 81. The lever section 82b is integrally formed with an upper portion of the insertion section 82a and abuts on the pin 80a.

When the urging gear 80 is rotated, the pin 80a abuts on the lever section 82b so that the lever 82 is pushed by the pin 80a to be rotated together with the urging gear 80. At this time, the winding-up lock member 81 into which the lever 82 is tightly inserted is also rotated together with the lever 82. When the regulating section 81c of the winding-up lock member 81 abuts on either of the regulation pins 85a and 85b on the way to rotating, the lever 82 slips relative to the winding-up lock member 81, and then, the lever 82 contin- ues to rotate together with the urging gear 80. In this way, while the urging gear 80 is rotated in one direction, the winding-up lock member 81 is held at the fixed position.

Figure 16:
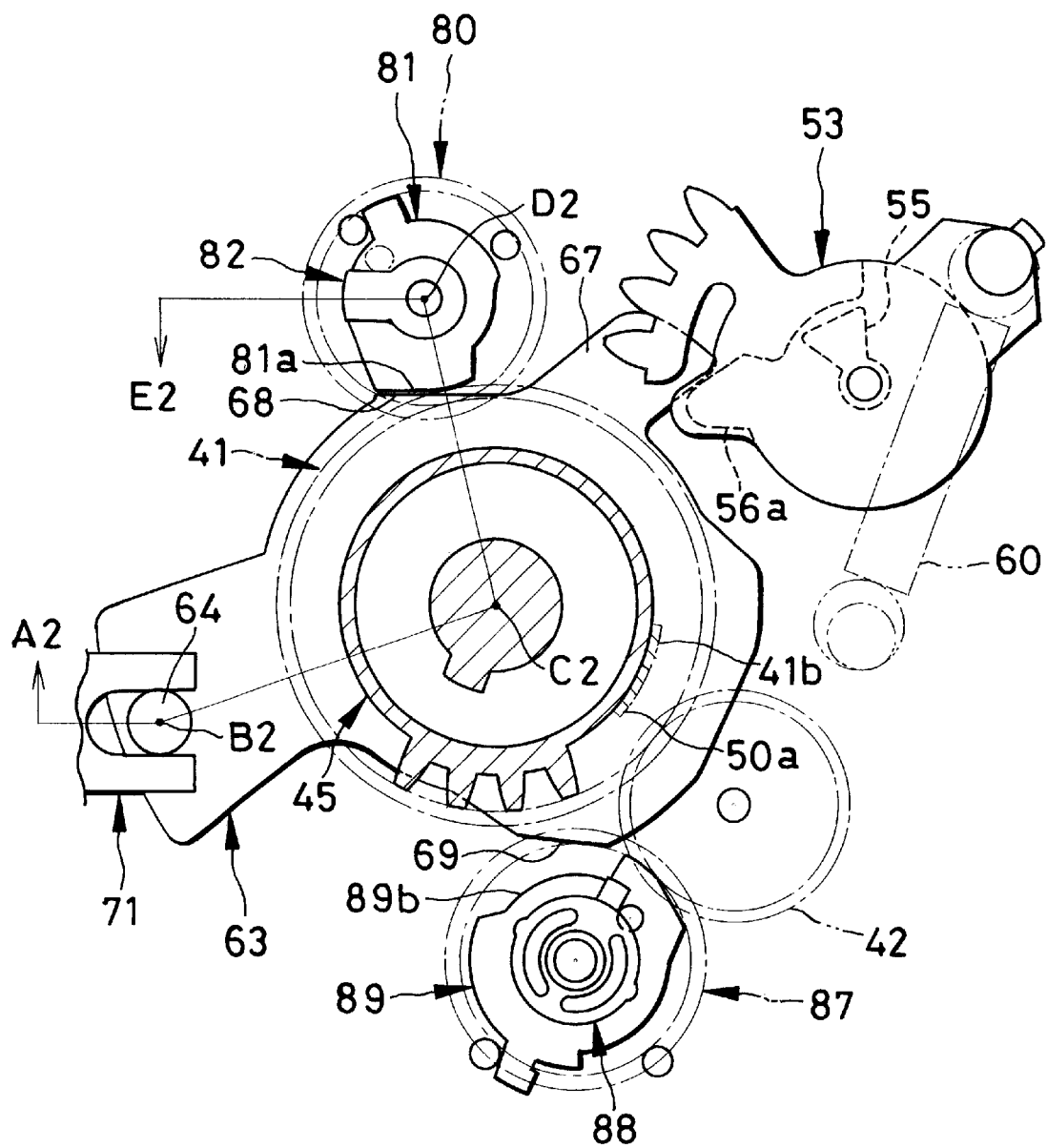
FIG. 16 is a plan view showing a state of the safety lock mechanism at the end of a FFS process.
Figure 17:
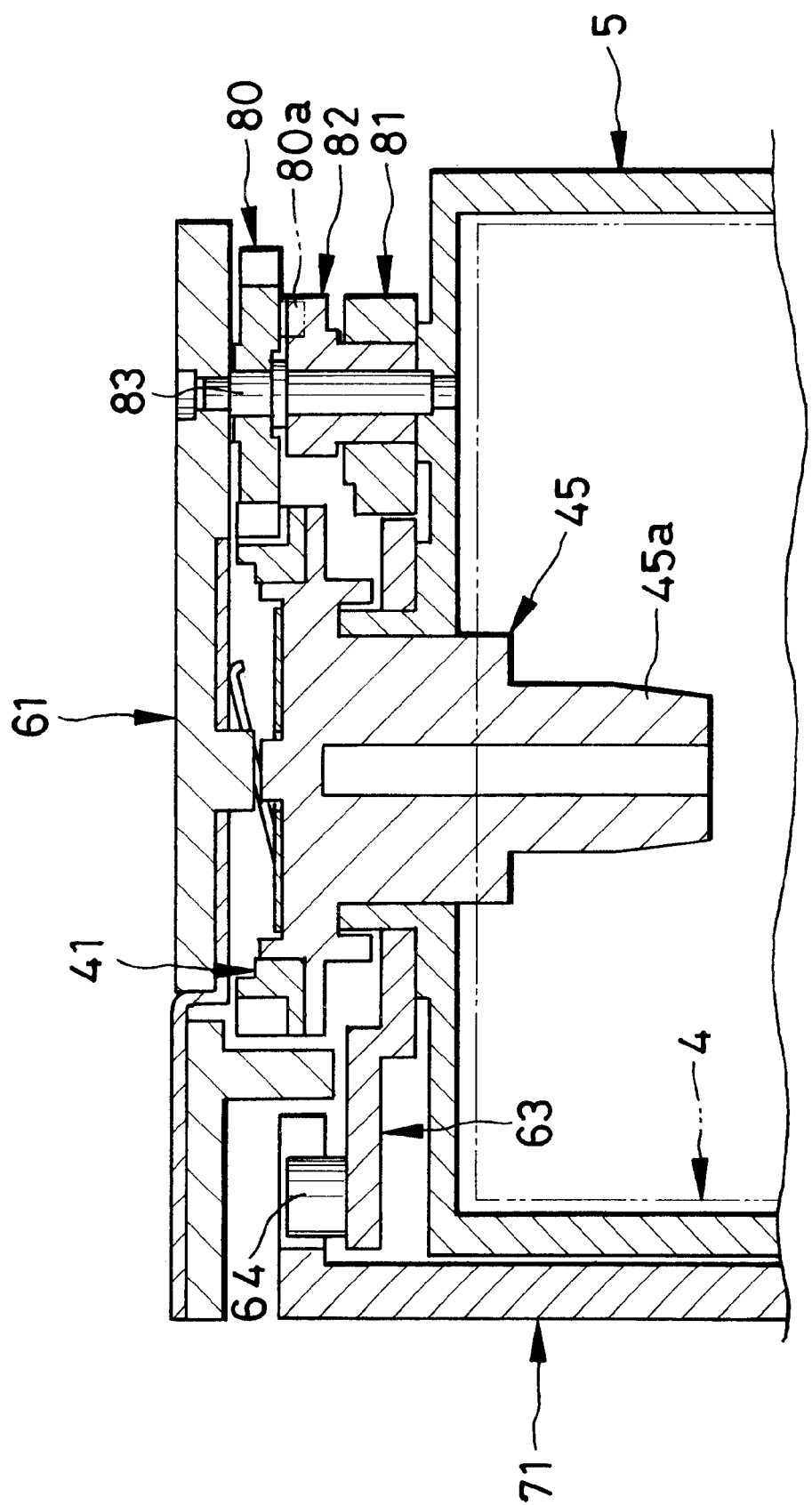
FIG. 17 is a partially sectional view of FIG. 16.

As shown in FIG. 16 and in FIG. 17 which is a partially sectional view taken along a line A2–B2–C2–D2–E2 in FIG. 16, the lock section 81a of the winding-up lock member 81 confronts the winding-up cam portion 68 of the intermediate lever 63 in a state that the regulating section 81c abuts on the regulation pin 85a. The lock section 81a enters a rotational locus of the intermediate lever 63 upon facing the winding-up cam portion 68 of the intermediate lever 63 to prevent the rotation thereof, namely to prevent the cartridge-chamber lid 8 from being opened. Meanwhile, as shown in FIG. 15, when the regulating section 81c abuts on the regulation pin 85b, the rotation permitting section 81b confronts the winding-up cam portion 68 of the intermediate lever 63. In this case, the rotational locus of the intermediate lever 63 is not interrupted so that the cartridge-chamber lid 8 is permitted to be opened.

The rewinding lock mechanism has a similar structure to the winding-up lock mechanism, and is constituted of an urging gear 87, a lever member 88, a rewinding lock member 89, and a torsion spring 90 which are rotatably supported by a support shaft 91.

The urging gear 87 is a rotary member meshing with the transmission gear 42 and rotated in association therewith. The rewinding lock member 89 has a disk-like shape, and a periphery thereof is formed with a projecting lock section 89a, a rotation permitting section 89b having a notch shape, and a regulating section 89c having a protrusion shape. A part of the upper face of the cartridge chamber 5 to which the rewinding lock member 89 is attached is provided with regulation pins 93a and 93b which abut on the regulating section 89c to restrict a rotational area of the rewinding lock member 89.

Rotational force is transmitted between the urging gear 87 and the rewinding lock member 89 by means of a pin 89d, which is formed on an upper face of the rewinding lock member 89, and the lever member 88. The lever member 88 comprises a resilient portion 88a having a disk shape, a lever portion 88b abutting on the pin 89d, and a shaft portion 88c rotatably inserted into the rewinding lock member 89. The resilient portion 88a is fitted into a recess 87a formed on a lower face of the urging gear 87 to be frictionally connected.

When the urging gear 87 is rotated, the lever member 88 is rotated therewith. On the way to rotating, the lever portion 88b abuts on the pin 89d to rotate the rewinding lock member 89. When the regulating section 89c of the rewinding lock member 89 abuts on either of the regulation pins 93a and 93b during the rotation, the lever member 88 slips relative to the urging gear 87 and only the urging gear 87 continues to rotate. In virtue of this, while the urging gear 87 rotates in another direction, the rewinding lock member 89 is held at a fixed position.

As shown in FIG. 15, the lock section 89a of the rewinding lock member 89 confronts the rewinding cam portion 69 of the intermediate lever 63 in a state that the regulating section 89c abuts on the regulation pin 93b. At this time, the lock section 89a enters the rotational locus of the intermediate lever 63 upon facing the rewinding cam portion 69 of the intermediate lever 63 to prevent the rotation thereof, namely to prevent the cartridge-chamber lid 8 from being opened. Meanwhile, in a state that the regulating section 89c abuts on the regulation pin 93a such as shown in FIG. 16, the rotation permitting section 89b confronts the rewinding cam portion 69 of the intermediate lever 63. Thus, the rotational locus of the intermediate lever 63 is not interrupted so that the cartridge-chamber lid 8 is permitted to be opened.

With respect to the torsion spring 90 being as a release spring, one end thereof is put on a pin 95 formed on the upper face of the cartridge chamber 5, and the other end thereof is put on the regulating section 89c of the rewinding lock member 89. Owing to this, the rewinding lock member 89 is urged such that the regulating section 89c is biased to abut on the regulation pin 93a. In other words, the rewinding lock member 89 is urged in a direction for permitting the rotation of the intermediate lever 63. Incidentally, as the release spring for urging the rewinding lock member 89 in the rotation permitting direction of the intermediate lever 63, it is possible to utilize tractive force and compression force of a coiled spring, besides the torsion spring. Otherwise, it is possible to provide a leaf-spring-like resilient piece on the rewinding lock member 89 as the release spring.

A range being capable of rotating the drive gear 41 at the time of removing the photo film cartridge 4 from the camera 2 is set such that the indication of the usage-state indication mechanism of the cartridge body 25 is not changed. Thus, when the photo film cartridge 4 is removed, release of the rewinding lock mechanism should be performed by slightly rotating the drive gear 41 in the film winding-up direction. In order to solve this, the torsion spring is used. When the urging gear 87 is rotated in the winding-up direction, the rewinding lock member 89 is simultaneously rotated in the winding-up direction. Then, the lock of the rewinding lock mechanism is released before the rotation of the drive gear 41 is transmitted to the spool driving member 45.

When the rotational direction of the drive gear 41 is changed from the film winding-up direction to the film rewinding direction, the lock of the intermediate lever 63 performed by the winding-up lock mechanism is released, and then, the lock of the intermediate lever 63 is simultaneously started by means of the rewinding lock mechanism. Thus, the cartridge-chamber lid 8 is adapted not to be opened, differently from a conventional safety lock mechanism, when the rotational direction of the motor 44 is changed.

Figure 18:
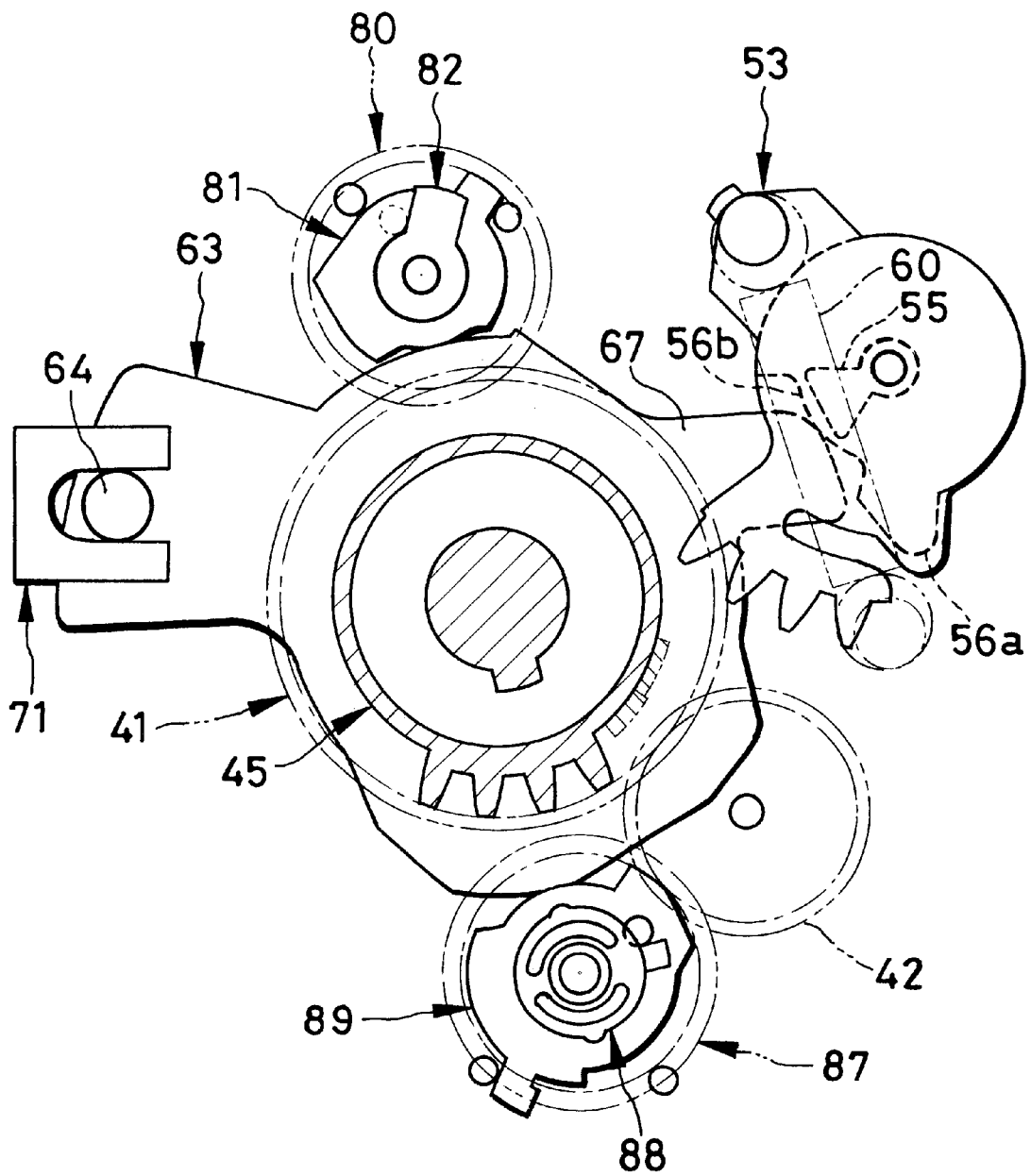
FIG. 18 is a plan view showing an initial state of the safety lock mechanism at the time when a lid of a cartridge chamber is opened.

As shown in FIGS. 9 and 18, the rotation of the intermediate lever 63 is permitted only when the rotation permitting sections 81b and 89b of the winding-up lock member 81 and the rewinding lock member 89 confront the intermediate lever 63. At this time, the rotation of the intermediate lever 63 is permitted so that the cartridge-chamber lid 8 can be opened. The cam portion 56 of the shielding-lid driving member 53 is provided with a notch 56b in order to avoid an interference for the press lever 67 of the intermediate lever 63.

By the way, the engagement shaft 45a of the spool driving member 45 sets a position corresponding to the exposed state of the usage-state indication mechanism as an initial position of the spool driving member 45, such as shown in FIG. 18. In case the photo film 6 is rewound on its way, the spool driving member 45 is kept in a state corresponding to the halfway state of the usage-state indication mechanism when the photo film cartridge 4 is drawn out. Thus, it is necessary to rotate the spool driving member 45 to the initial position after removing the photo film cartridge and before containing the new photo film cartridge. Rotating the spool driving member 45 to the initial position is performed under a state that the photo film cartridge 4 is removed out of the cartridge chamber 5 and the cartridge-chamber lid 8 is opened.

In the state that the cartridge-chamber lid 8 is opened, the periphery of the intermediate lever 63 abuts on the rotation permitting sections 81b and 89b of the winding-up lock member 81 and the rewinding lock member 89, such as shown in FIG. 18, so that the winding-up lock member 81 and the rewinding lock member 89 are prevented from rotating. Thus, even if the spool driving member 45 is rotated by rotating the drive gear 41, the winding-up lock member 81 and the rewinding lock member 89 are not rotated. In virtue of this, the spool driving member 45 may be rotated to the initial position without changing a positional relationship between the intermediate lever 63 and both of the winding-up lock member 81 and the rewinding lock member 89.

As shown in FIG. 8, a conveyor passage of the photo film 6 is provided with a perforation sensor 98 for detecting the perforations 36a and 36b formed at the side edge of the photo film 6. For example, the perforation sensor 98 comprises a light source for emitting infrared rays, and a light receiver for outputting a photoelectric signal in accordance with strength of the incidence light. The photoelectric signal from the perforation sensor 98 is sent to a microcomputer 99 after being converted to a binary form by means of a signal conversion circuit which is not shown. As to the above-noted binary form, the signal is set to an L level when the perforation sensor 98 faces the perforations 36a and 36b. Except this case, the signal is set to a H level.

An encoder 101 is constituted of a roller, an encode plate 102 and a photo interrupter 103. The roller is rotated in accordance with the movement of the photo film 6 in the advancing direction. The encode plate 102 is rotated together with the roller and is formed with radial slits arranged at prescribed pitches. The photo interrupter 103 comprises a light emitter and a light receiver which are disposed so as to interpose the encode plate 102. The encoder 101 generates an encode pulse whenever the photo film 6 is advanced by a predetermined length. This pulse signal is inputted into the microcomputer 99. Based on the pulse signal, the microcomputer 99 controls the film advancing mechanism to correct a position of a frame, and measures an advancement length of the photo film 6, for example.

A magnetic head 105 is supported at the left of the encoder 101 in FIG. 8 so as to contact the magnetic recording section 38 formed at the side edge of the photo film 6. The magnetic head 105 is driven by a head driver 106 and magnetically records various information outputted from the microcomputer 99. The various information are recorded in a form of the binary code within a magnetic recording area corresponding to the frame of the photo film 6, during a film winding-up operation. The binary code, which represents exposure control data and various date of print-number data, title data and so forth, is sent from the microcomputer 99 to the head driver 106 when the exposure has been completed. The head driver 106 drives the magnetic head 105 based on the binary code. For example, a film advancement speed in magnetic recording is calculated by the microcomputer 99 on the basis of the encode pulse signal. Further, the magnetic head 105 is driven in timing corresponding to the film advancement speed. In this way, the respective bits magnetically recorded in the magnetic recording section 38 of the photo film 6 are adapted to have a fixed length.

Incidentally, the magnetic head 105 may be supported so as to be separable from the magnetic recording section 38 of the photo film 6. In this case, the magnetic head 105 contacts the photo film 6 only when magnetic recording, magnetic erasing and so forth are carried out. Except for this occasion, the magnetic head 105 is separated from the photo film 6.

The microcomputer 99 controls the motor 44 via a motor driver 108. As to the motor 44, a DC motor is used, for example. A rotary shaft of the DC motor is provided with an encoder plate in which slits are formed at predetermined intervals. The slit of the encoder plate is monitored by a photo interrupter or the like to detect a rotational amount of the motor. Otherwise, a pulse motor may be used as the motor 44. In this case, the encoder plate is unnecessary. The rotational amount is controlled by counting a drive pulse. As described above, the motor 44 is incorporated in the winding-up shaft 47 to drive the winding-up shaft 47 and the spool 26 of the photo film cartridge 4 via the drive transmission mechanism 46.

The microcomputer 99 is connected to the MR switch 22 and the respective setting switches 19 to 21. Further, the microcomputer 99 is connected to a program ROM 110 for storing a control program, a data ROM 111 for storing various control data, and a RAM 112 for temporarily saving various data obtained during the control operation.

Next, an operation of the above embodiment is described below. FIGS. 9 and 10 show the film conveying mechanism and the safety lock mechanism in the initial state wherein the photo film cartridge 4 is not contained and the cartridge-chamber lid 8 is closed. Under this state, the shielding-lid driving member 53 is set to a position corresponding to the closed position of the light shielding lid 28, and the spool driving member 45 is set to a position coinciding with the exposed state of the usage-state indication mechanism. The rotation permitting sections 81b and 89b of the winding-up lock member 81 and the rewinding lock member 89 confront the intermediate lever 63. Thus, the intermediate lever 63 is rotatable.

Figure 13:
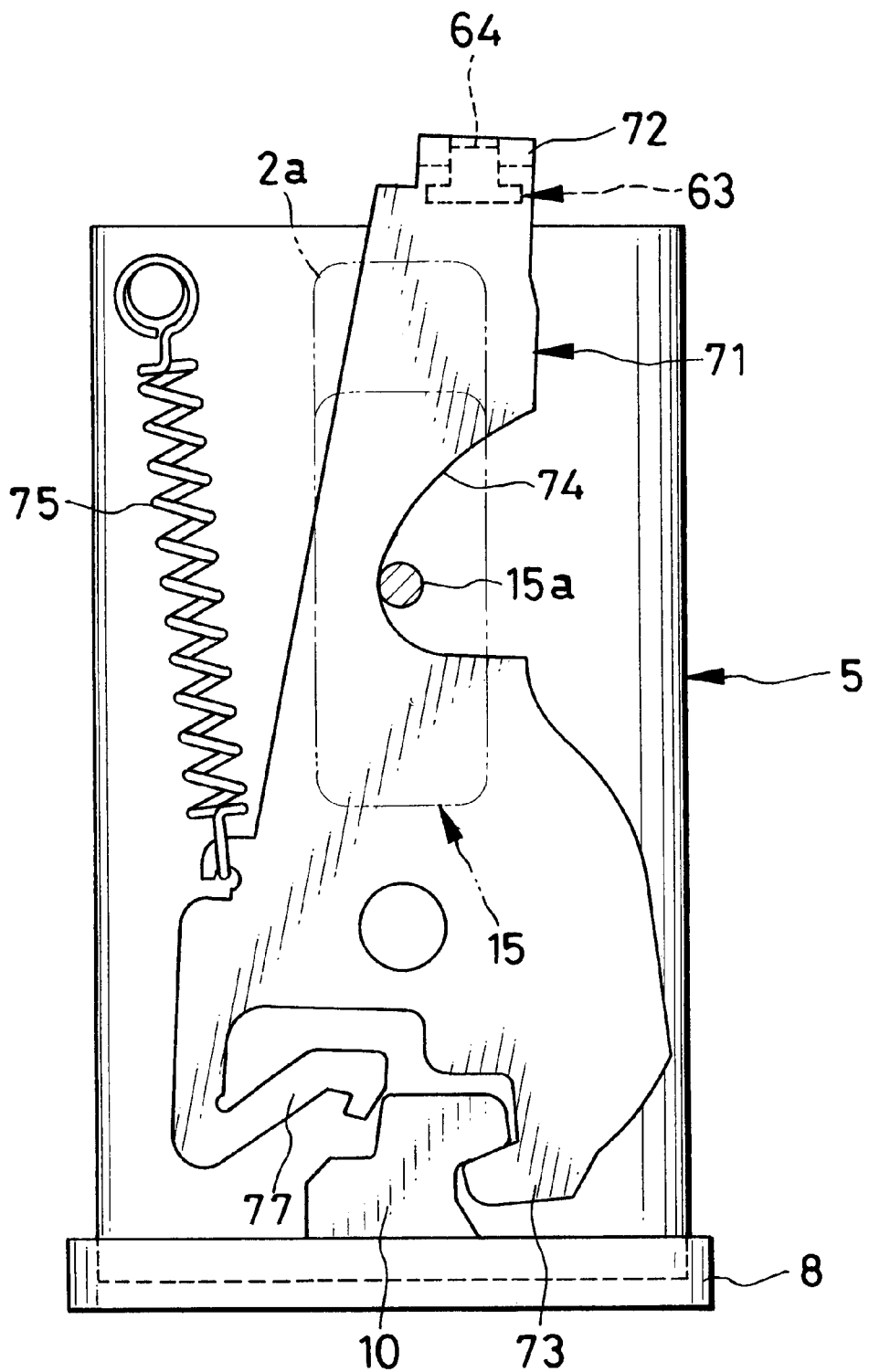
FIG. 13 is a side view showing structure of a chamber-lid operation mechanism set to an engagement state.

In a state that the cartridge-chamber lid 8 is closed, as shown in FIG. 13, the engagement portion 73 of the engagement lever 71 engages with the hook 10 of the cartridge-chamber lid 8 owing to the coiled spring 75, and the operation member 15 is positioned at the lower portion of the slit 2a. Upon sliding the operation member 15 upward, as shown in FIG. 14, the engagement lever 71 is swung against the urging force of the coiled spring 75 to release the engagement of the engagement portion 73 and the hook 10. And then, the hook 10 is pushed by the resilient portion 77. Consequently, the cartridge-chamber lid 8 is pressed in the opening direction to open the cartridge chamber 5.

The swing of the engagement lever 71 is transmitted to the intermediate lever 63, and the intermediate lever 63 is rotated in the clockwise direction such as shown in FIG. 18. At this time, the periphery of the intermediate lever 63 abuts on the rotation permitting sections 81b and 89b of the winding-up lock member 81 and the rewinding lock member 89 to prevent unnecessary rotation of the lock members 81 and 89 caused by sway, shock and so forth. Meanwhile, the press lever 67 of the intermediate lever 63 enters the notch 56b of the cam portion 56 of the shielding-lid driving member 53 to prevent the shielding-lid driving member 53 from being rotated toward the open position.

After opening the cartridge-chamber lid 8, the cartridge chamber 5 is loaded with the photo film cartridge 4 such as shown in FIG. 1. The engagement shaft 45a integrally formed with the spool driving member 45 engages with the engagement hole 26a of the spool 26. The engagement shaft 55 integrally formed with the shielding-lid driving member 53 engages with the engagement hole 28a of the light shielding lid 28. The engagement plate 62 incorporated in the engagement shaft 45a is elastically deformed to enter the engagement shaft 45a. Thus, the engagement shaft 45a can be inserted into the engagement hole 26a, even if a direction of the spool 26 of the photo film cartridge 4 is different from that of the engagement shaft 45a.

When the cartridge chamber 5 is loaded with the photo film cartridge 4, a cartridge detection switch is turned on to input a detection signal into the microcomputer 99. Successively, when the cartridge-chamber lid 8 is closed, the hook 10 of the cartridge-chamber lid 8 engages with the engagement portion 73 of the engagement lever 71 to retain the cartridge-chamber lid 8 at the closed position.

When the cartridge-chamber lid 8 is retained at the closed position, the intermediate lever 63 is simultaneously rotated to the position shown in FIG. 9. The lever-position sensor 79 comprising the brush 65 and the printed circuit board detects the intermediate lever 63 set to the closed position, and inputs a detection signal into the computer 99. When the detection signals from the cartridge detection switch and the lever-position sensor 79 are inputted, the computer 99 judges safe completion of a cartridge containing process, and starts to perform various processes for photographic preparation.

The first process performed after loading is the DEP process (the film-data reading process and the usage-state detection process). This DEP process is performed in a state that the film conveying mechanism is driven in the film rewinding direction. The computer 99 rotates the motor 44 in the rewinding direction via the motor driver 108. The rotation of the motor 44 is transmitted to the drive transmission mechanism 46 which reduces the rotational speed of the motor 44 by a plurality of gears. Further, the epicyclic gear unit included in the drive transmission mechanism 46 transmits the rotation of the motor 44 only to the transmission gear 42.

In FIG. 9, the transmission gear 42 is rotated in the clockwise direction, and the rotation of the transmission gear 42 is transmitted to the drive gear 41. The drive gear 41 is rotated on the spool driving member 45 in the counter-clockwise direction. During the rotation, the protrusion 41b abuts on the engaged protrusion 50a. Upon this, the spool driving member 45 starts to rotate together with the drive gear 41.

When the spool driving member 45 is rotated in the film rewinding direction, the shielding-lid driving gear 52 meshes with the gear portion 57 of the shielding-lid driving member 53 to rotate the shielding-lid driving member 53 to the open position of the light shielding lid 28. When the shielding-lid driving member 53 is rotated by the shielding-lid driving gear 52 up to a halfway position, the driving member 53 is rotated to the open position by the urging force of the coiled spring 60. The shielding-lid driving member 53 is held at this position so that the light shielding lid 28 of the photo film cartridge 4 is opened.

While the spool 26 is rotated in the rewinding direction, the bar code reader attached to the upper portion of the cartridge chamber 5 reads the bar code of the data disk 30 rotating together with the spool 26. The computer 99 identifies a kind of the photo film 6, a photographable number, sensitivity and so forth from the bar code read by the bar code reader. A stop position of the spool 26 at the time of loading is calculated from a position of the notch of the date disk 30. Further, the indication of the usage-state indication mechanism are specified from the stop position of the spool 26. Data obtained by the DEP process is stored in the RAM 112 and so forth to be used for controlling photographing process.

During the DEP process, the rotation of the transmission gear 42 is transmitted to the urging gears 80 and 87. The urging gear 80 in the DEP process is rotated in the clockwise direction in FIG. 9. The pin 80a provided on the lower face of the urging gear 80 abuts on the lever section 82b of the lever member 82 during the rotation of the urging gear 80 to rotate the lever member 82. Further, the lever member 82 is frictionally coupled with the winding-up lock member 81 so that the winding-up lock member 81 is also rotated in the same direction. The winding-up lock member 81 rotated in the clockwise direction is prevented from further rotation because the regulating section 81c abuts on the regulation pin 85b. However, the lever member 82 slips relative to the winding-up lock member 81 so that the urging gear 80 continues to rotate and the winding-up lock member 81 is held at the fixed position.

The urging gear 87 directly meshes with the transmission gear 42 and is rotated in the counterclockwise direction in FIG. 9 during the DEP process. When the urging gear 87 is rotated in the counterclockwise direction, the lever member 88 frictionally coupled to the urging gear 87 is rotated together therewith. On the way to rotating, the lever portion 88b of the lever member 88 abuts on the pin 89d of the rewinding lock member 89 to rotate the rewinding lock member 89 together therewith. As to the rewinding lock member 89 rotated in the counterclockwise direction, the regulating section 89c abuts on the regulation pin 93b so that further rotation is prevented. However, the lever member 88 slips relative to the urging gear 87. Thus, the urging gear 87 continues to rotate, whereas the rewinding lock member 89 is held at the fixed position.

As described above, in the safety lock mechanism under the DEP process, or under the film rewinding process, the rotation permitting section 81b of the winding-up lock member 81 confronts the winding-up cam portion 68 of the intermediate lever 63 to permit the rotation of the intermediate lever 63. At this time, the rewinding lock member 89 confronts the lock section 89a with the rewinding cam portion 69 of the intermediate lever 63 to prevent the rotation of the intermediate lever 63. Accordingly, the intermediate lever 63 is not rotated during the DEP process so that the cartridge-chamber lid 8 is not carelessly opened.

When the indication of the usage-state indicating mechanism of the contained film cartridge 4 represents either of the "unused state" and the "halfway state", an FFS process described later is carried out. Meanwhile, when the indication represents either of the "exposed state" and the "developed state", the spool 26 is stopped so as to confront the indication plate 31 with the indication opening 33c representing the exposed state. Then, the lock of the safety lock mechanism is released so as to be capable of removing the photo film cartridge 4 out of the cartridge chamber 5. This is described later in detail. Incidentally, in case of mis-loading, an error indication is displayed on the LCD 18, otherwise, a buzzer or the like may be sounded.

In the FFS (First Frame Set) process, the film conveying mechanism is driven in the film winding-up direction. The computer 99 rotates the motor 44 via the motor driver 108 in the winding-up direction. The rotation of the motor 44 is transmitted to the drive transmission mechanism 46 which reduces the rotational speed of the motor 44 by the gears. Moreover, the epicyclic gear unit included in the drive transmission mechanism 46 transmits the rotation of the motor 44 to the transmission gear 42 and the winding-up shaft 47.

The transmission gear 42 rotates the drive gear 41 on the spool driving member 45 in the clockwise direction. On the way to rotating, the protrusion 41b abuts on the engaged protrusion 50a to transmit the rotation of the drive gear 41 to the spool driving member 45. When the spool driving member 45 is rotated in the film winding-up direction, the spool 26 of the photo film cartridge 4 is also rotated in the film winding-up direction so that the photo film 6 is advanced through the film mouth 25a of the cartridge body 25 by a built-in film advancing mechanism.

The photo film 6 having been advanced from the cartridge body 25 passes through the film passage, and then, the leading perforation 37 is detected by the perforation sensor 98. Detection of the perforation 37 is utilized for judging whether or not the photo film 6 is normally advanced from the cartridge body 25. Thus, in case the perforation 37 is not detected for a predetermined period from the start of the FFS process, it is judged that the photo film 6 is not normally advanced due to any trouble regarding either of the photo film cartridge 4 and the camera itself. In this case, the computer 99 rotates the motor 44 in the rewinding direction to rewind the photo film 6 into the cartridge body 25. After that, the usage-state indicating mechanism is set so as to be adjusted to the usage state obtained by the DEP process, and the lock of the safety lock mechanism is released. Incidentally, also at this time, an error indication may be displayed on the LCD 18, otherwise, a buzzer or the like may be sounded.

The leader of the advanced photo film 6 is wound on the winding-up shaft 47. Successively, the photo film 6 is wound by rotating the winding-up shaft 47. Meanwhile, a film winding speed of the winding-up shaft 47 is adapted to be slightly faster than a film advancing speed of the spool driving member 45. Thus, the photo film 6 is pulled by the winding-up shaft 47. However, the drive transmission mechanism 46 has an incorporated clutch mechanism for slipping the spool driving member 45 so that bad influence is not given to the photo film 6. The top of the unused frames of the photo film 6 is set to a photographic position so as to be adjusted to the usage state obtained by the DEP process.

During the FFS process, the urging gear 80 is rotated in the counterclockwise direction and the urging gear 87 is rotated in the clockwise direction. When the urging gear 80 is rotated in the counterclockwise direction, the pin 80a abuts on the lever section 82b of the lever 82 on the way to rotating so that the lever 82 is rotated together therewith. Further, the winding-up lock member 81 frictionally coupled with the lever 82 is also rotated in the same direction. As for the winding-up lock member 81 rotating in the counter-clockwise direction, the regulation section 81c abuts on the regulation pin 85a so that further rotation is prevented. However, the lever 82 slips relative to the winding-up lock member 81. Thus, the winding-up lock member 81 is held at the fixed position whereas the urging gear 80 continues to rotate.

As shown in FIG. 16, the winding-up lock member 81 in the FFS process confronts the lock section 81a with the winding-up cam portion 68 of the intermediate lever 63 to prevent the rotation of the intermediate lever 68. Owing to this, the cartridge-chamber lid 8 is not mistakenly opened during the FFS process.

The urging gear 87 in the FFS process rotates in the clockwise direction. At this time, the lever member 88 frictionally coupled with the urging gear 87 is rotated together therewith. When the DEP process is changed to the FFS process, in other words, when the film conveying direction is changed from the rewinding direction to the winding-up direction, the urging force caused by the urging gear 87 is released. At the same time, the rewinding lock member 89 is rotated by the torsion spring 90 in the clockwise direction and is stopped at the position where the regulating section 89c abuts on the regulation pin 93a. In this state, the rewinding lock member 89 confronts the rotation permitting section 89b with the rewinding cam portion 69 of the intermediate lever 63.

After completion of the FFS process, the camera 2 becomes a standing-by state wherein photographic preparations are made. A user watches a subject through a viewfinder. The user depresses the shutter button after framing the subject. Upon this, the shutter release is performed by a shutter unit which is not shown. After the shutter release, a process for winding one frame is carried out. In the one-frame winding process, the motor 44 is rotated in the winding-up direction so that the winding-up shaft 47 of the film chamber is rotated in the film winding-up direction to wind the photo film 6 into the film chamber by one frame. At the time of winding the photo film, the photographic data is magnetically recorded in the magnetic recording section 38 of the photo film 6 by the magnetic head 105 driven by the head driver 106. When the next unexposed frame is set to the aperture, the motor 44 is stopped.

When the one-frame winding process is performed after photographing, the winding-up lock member 81 successively prevents the rotation of the intermediate lever 63 after the FFS process. Thus, the cartridge-chamber lid 8 is not opened.

When all frames of the photo film 6 contained in the cartridge 4 have been exposed and when the MR switch 22 is handled, the film rewinding process is carried out. In this film rewinding process, the microcomputer 99 rotates the motor 44 in the rewinding direction. Thus, similarly to the DEP process, the rewinding lock member 89 inhibits the intermediate lever 63 from rotating so that the cartridge-chamber lid 8 is prevented from being mistakenly opened during the film rewinding operation.

After the rewinding process, the motor 44 continues to rotate in the rewinding direction and the VEI process for setting the indication of the usage state is carried out. In the VEI process after exposing all frames, the spool 26 is stopped so as to confront the indication plate 31 with the indication opening 33c. Meanwhile, in the VEI process after rewinding the photo film halfway, the spool 26 is stopped so as to confront the indication plate 31 with the indication opening 33b. Stop control of the spool 26 is accurately performed by the spool-position sensor 54 comprising the brush 48 and the printed circuit board 51. Also in the VEI process, the rewinding lock member 89 inhibits the intermediate lever 63 from rotating so that the cartridge-chamber lid 8 is not mistakenly opened.

After the VEI process, a process for releasing the safety lock is carried out. In this process, the motor 44 is rotated in the film winding-up direction to rotate the drive gear 41 in the winding-up direction by an extent that the engaging protrusion 41b does not abut on the engaged protrusion 50a. In other words, the drive gear 41 is rotated in the winding-up direction by an extent that the spool driving member 45 does not start to rotate.

When the drive gear 41 is rotated in the winding-up direction, the urging force of the urging gear 87 is released. At the same time, the rewinding lock member 89 is rotated in the clockwise direction by the torsion spring 90 and is stopped at the position where the regulating section 89c abuts on the regulation pin 93a. Under this state, the rewinding lock member 89 confronts the rotation permitting section 89b with the rewinding cam portion 69 of the intermediate lever 63 to permit the rotation of the intermediate lever 63. Meanwhile, the winding-up lock member 81 has the play on the rotational transmission relative to the urging gear 80. Thus, even if the drive gear 41 is slightly rotated, the winding-up lock member 81 is not moved to the position for locking the intermediate lever 63. Consequently, the lock of the safety lock mechanism may be released without changing the indication of the usage-state indication mechanism of the photo film cartridge 4.

When the operation member 15 is slid upward as shown in FIG. 14, the engagement lever 71 is swung and the engagement of the engagement portion 73 and the hook 10 is released so that the cartridge-chamber lid 8 is opened. Moreover, as shown in FIG. 18, since the engagement lever 71 is swung, the intermediate lever 63 is rotated. On the way to rotating, the press lever 67 of the intermediate lever 63 presses the protrusion 56a of the cam portion 56 of the shielding-lid driving member 53 to rotate the shielding-lid driving member 53 toward the closed position of the light shielding lid 28. Thus, the film mouth 25a of the photo film cartridge 4 is light-tightly closed by the light shielding lid 28.

Upon opening the cartridge-chamber lid 8, the photo film cartridge 4 is pushed from the cartridge chamber 5 by means of the eject mechanism 12. For This, the film cartridge 4 may be easily removed out of the cartridge chamber 5.

In the above embodiment, the camera loaded with the photo film cartridge of the IX-240 type is explained as an example. However, the present invention is also applicable to cameras loaded with photo films having the other formats of 135-type and so forth.

As described above, the camera according to the present invention is provided with the winding-up lock mechanism and the rewinding lock mechanism. The winding-up lock mechanism locks the cartridge-chamber lid when the photo film is wound. The rewinding lock mechanism locks the cartridge-chamber lid when the photo film is rewound. Thus, the cartridge-chamber lid may be locked in all the processes for moving the photo film so that it is possible to prevent the film exposure caused by mistakenly opening the cartridge-chamber lid.

The winding-up lock mechanism and the rewinding lock mechanism are operated by the film conveying mechanism being as a driving source. Therefore, an exclusive motor and an exclusive actuator are not necessary so that a camera may be downsized and electric power may be saved.

Further, the play is provided between the rotational member and the lock member, and the spring for urging the lock member toward the lock releasing position is provided, and the delay transmission mechanism for belatedly transmitting the rotation of the motor to the spool is provided. Thus, the lock of the safety lock mechanism may be released without changing the indication of the usage-state indication mechanism of the photo film cartridge.

Next, another embodiment according to the present invention is described below. In the foregoing embodiment, the drive gear 41 comes into contact with the spool driving member 45 at the gear holder. Thus, when the drive gear is rotated, the spool driving member is rotated in association therewith owing to frictional force generated by the contact with the drive gear. In case the associated rotation is caused, the indication of the usage state is likely to be changed because of shifting the spool position set by the VEI process. In this embodiment, the safety lock may be released by simple structure without changing the usage-state indication of the photo film cartridge. Incidentally, an identical member with the foregoing embodiment is denoted by the same reference numeral, and its description is omitted.

Figure 5B:
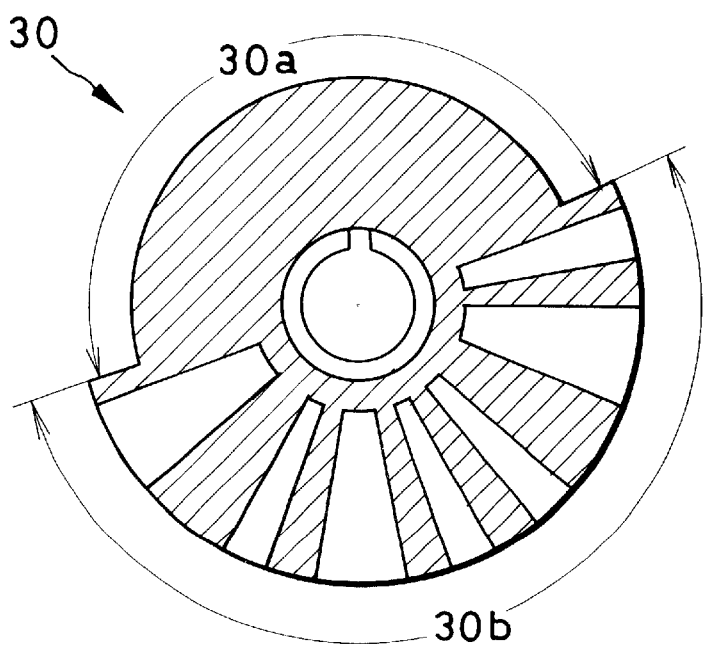
FIG. 5B is a plan view of a data disk.

As shown in FIGS. 5A and 5B, the data disk 30 is formed with a code pattern comprising a quiet zone 30a and a code section 30b. The quiet zone 30a is formed such as to cut a part of a periphery of the data disk 30. The bar code section 30b includes a black bar and a white bar.

The bar code reader 58 employs a photo sensor, for example, which comprises a light source for irradiating the data disk and a light receiver for receiving the reflected light. The bar code reader 58 reads the code pattern to send a detection signal to the microcomputer. The black bar and the white bar have different reflection factors so that the bar code reader 58 generates two detection signals of a high level and a low level. The microcomputer discriminates the black bar and the white bar on the basis of the difference of the respective detection signals. The reflection factor of the black bar is substantially identical with that of the quiet zone 30a. However, the quiet zone 30a is formed so as to have a larger angle in comparison with the black bar. Thus, when the white bar is not detected during a predetermined rotation of the motor, it is judged to be the quiet zone 30a. In this way, based on the detection signal from the bar code reader 58 and the rotational amount of the motor, the microcomputer detects each of the quiet zone 30a, the black bar and the white bar.

Further, the position of the data disk 30 may be identified based on the detection signal of the bar code reader 58 and the rotational amount of the motor. Accordingly, it is possible to identify the position of the spool 26 integrally rotating with the data disk 30. Thus, it is possible to detect the position of the spool 26 when the photo film cartridge 4 is contained. Moreover, it is possible to control the stop position of the spool 26 when the photo film has been rewound. Incidentally, reading the data disk 30 and identifying the position of the spool 26 from the data disk 30 are disclosed in Japanese Patent Laid-Open Publication Nos. 10-31243, 10-39366 and so forth in detail.

The camera 2 carries out the usage-state detection process (DEP process) for detecting the usage state of the photo film cartridge 4 when the cartridge 4 is contained. This detection process is carried out by identifying the spool position when the bar code reader 58 reads the data disk 30 at the time of loading. When it is detected after the DEP process that the usage state of the cartridge 4 at the time of loading is the "exposed state" or the "developed state", the spool 26 is set to the position corresponding to the detected usage state. Then, a warning is displayed on the LCD and the succeeding process is stopped.

After the photo film 6 has been rewound, the camera 2 successively rotates the spool 26 in the rewinding direction to control the stop position of the spool 26. In this way, is carried out the VEI process for setting the usage state of the photo film cartridge 4. Controlling the stop position of the spool 26 is also performed, reading the data disk 30 by the bar code reader 58. Owing to the VEI process, the usage state of the photo film cartridge 4 is set to either of the "halfway state" and the "exposed state".

In this embodiment, the bar code reader 58 works as the spool-position sensor 54 of the first embodiment. Thus, electrical structure of this embodiment is shown by FIG. 8 in which the spool-position sensor 54 is replaced with the bar code reader 58.

Figure 19A:
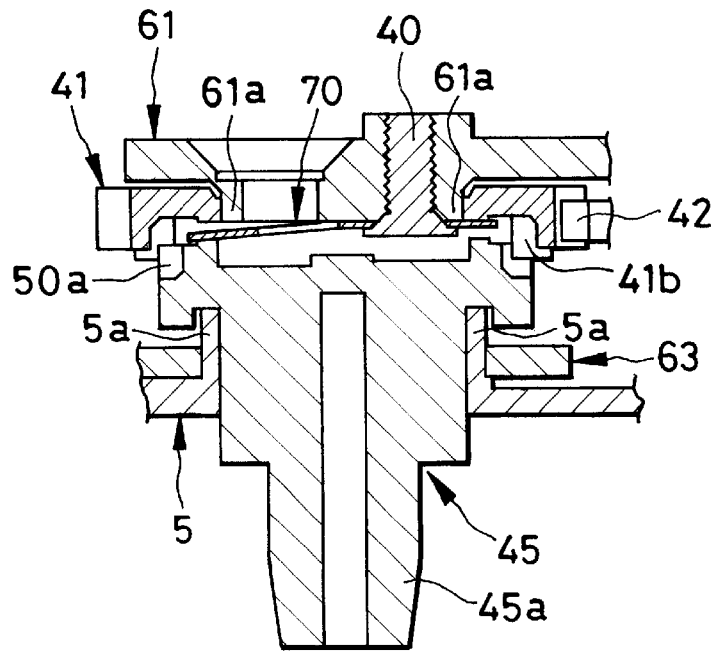
FIGS. 19A and 19B are sectional views showing disposition of a drive gear and a spool driving member in the other embodiment.
Figure 19B:
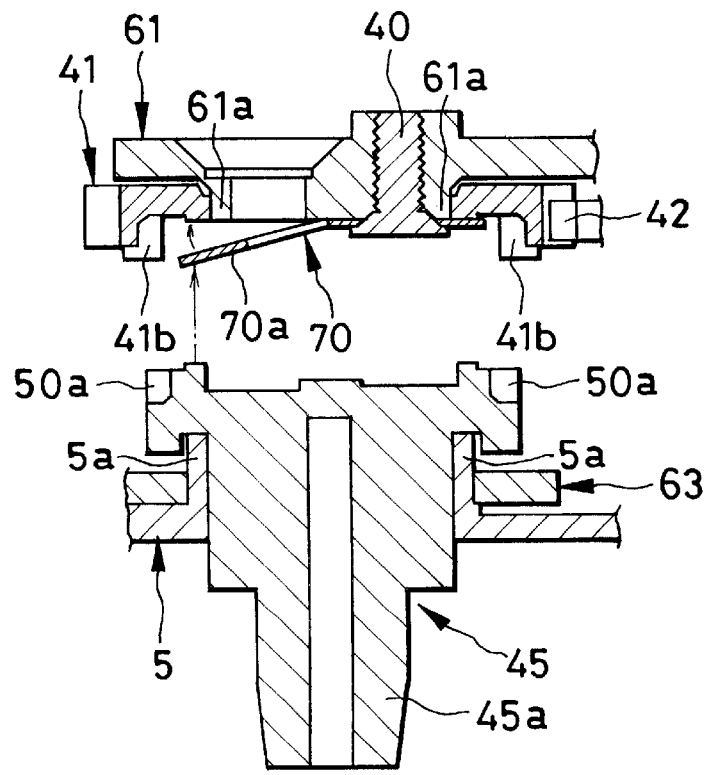

FIGS. 19A and 19B are partially sectional views of the film conveying mechanism. A lower face of the roof plate 61 is formed with an annular boss 61a. The inside portion 41a of the drive gear 41 is fitted to the boss 61a so as to be rotatably attached. This drive gear 41 is supported from its lower side by a press plate 70. The spool driving member 45 is integrally formed with the engagement shaft 45a engaging with the spool 26 of the photo film cartridge 4. The engagement shaft 45a is inserted into a hole formed in the boss 5a of the upper face of the cartridge chamber 5 to project into the cartridge chamber 5. The spool driving member 45 is fitted to the boss 5a so as to be rotatably supported.

The drive gear 41 has an annular shape and is provided with teeth arranged on a periphery thereof. An upper portion of the spool driving member 45 is integrally formed with a support projection 50 having an annular shape. Moreover, the inside portion 41a of the drive gear 41 is integrally formed with a pair of engaging protrusions 41b projecting toward the inside. Meanwhile, the periphery of the support projection 50 of the spool driving member 45 is formed with a pair of engaged protrusions 50a on which the engaging protrusions 41b of the drive gear 41 abut.

As shown in FIGS. 19A and 19B, the press plate 70 is disposed between the drive gear 41 and the spool driving member 45 such that the drive gear 41 does not contact with the spool driving member 45 except the portion of the engaging protrusion 41b and the engaged protrusion 50a. For example, the press plate 70 is a thin plate having elasticity and made of a metal or a plastic. The press plate 70 is fixed, by a screw 40, to the roof plate 61 constituting the camera body so that the press plate 70 is prevented from being rotated in association with the rotation of the drive gear 41.

As shown in FIG. 19B, before the roof plate 61 is attached to the cartridge chamber 5, a part of the press plate 70 is bent toward the spool driving member 45. When the roof plate 61 is attached to the cartridge chamber 5, the spool driving member 45 pushes up a bend portion 70a to elastically deform the press plate 70, such as shown in FIG. 19A. Reaction caused by the elastic deformation presses the bend portion 70a against the upper face of the spool driving member 45. When urging force is applied from the press plate 70, the spool driving member 45 is pressed against the upper face of the cartridge chamber 5. In virtue of this, the spool driving member 45 is prevented from being carelessly rotated by vibration, impact or the like.

The spool driving member 45 is integrally formed with the shielding-lid driving gear 52. This shielding-lid driving gear 52 rotates the light shielding lid 28 from the closed position to the open position in the film-data reading process and the usage-state detection process (the DEP process) which are carried out just after containing the photo film cartridge 4.

While the spool 26 is rotated in the rewinding direction, the bar code reader 58 reads the bar code of the data disk 30 rotating together with the spool 26. The computer 99 identifies a kind of the photo film 6, a photographable number, sensitivity and so forth from the bar code read by the bar code reader. Moreover, a stop position of the spool 26 at the time of loading is calculated from a position of the date disk 30. Further, the indication of the usage-state indication mechanism are specified from the stop position of the spool 26. Data obtained by the DEP process is stored in the RAM 112 and so forth to be used for controlling photographic process.

After the rewinding process, the motor 44 continues to rotate in the rewinding direction and the VEI process for setting the indication of the usage state is carried out. In the VEI process after exposing all frames, the spool 26 is stopped so as to confront the indication plate 31 with the indication opening 33c. Meanwhile, in the VEI process after rewinding the photo film halfway, the spool 26 is stopped so as to confront the indication plate 31 with the indication opening 33b. Stop control of the spool 26 is performed based on the detection signal from the bar code reader 54 and the rotational amount of the motor 44. Also in the VEI process, the rewinding lock member 89 inhibits the intermediate lever 63 from rotating so that the cartridge-chamber lid 8 is not mistakenly opened.

When the drive gear 41 is rotated in the winding-up direction, the urging force of the urging gear 87 is released. At the same time, the rewinding lock member 89 is rotated in the clockwise direction by means of the torsion spring 90 and is stopped at the position where the regulating section 89c abuts on the regulation pin 93a. Under this state, the rewinding lock member 89 confronts the rotation permitting section 89b with the rewinding cam portion 69 of the intermediate lever 63 to permit the rotation of the intermediate lever 63. Meanwhile, the winding-up lock member 81 has the play on the rotational transmission relative to the urging gear 80. Thus, even if the drive gear 41 is slightly rotated, the winding-up lock member 81 is not moved to a position for looking the intermediate lever 63. When the process for releasing the safety lock is over, the rotation of the motor is stopped.

The press plate 70 fixed to the roof plate 61 is disposed between the drive gear 41 and the spool driving member 45. By means of the press plate 70, the drive gear 41 and the spool driving member 45 are arranged so as not to contact with each other except the portion of the engaging protrusion 41b and the engaged protrusion 50a. Thus, the spool driving member 45 is not rotated in association with the rotation of the drive gear 41. Consequently, the lock of the safety lock mechanism may be released without changing the indication of the usage-state indication mechanism of the photo film cartridge 4.

The spool driving member 45 is pressed against the boss 5a of the cartridge chamber 5 by the urging force applied from the bend portion 70a of the press plate 70. Thus, even if the camera 2 is carried without removing the photo film cartridge 4 under the lock released state, the spool driving member 45 is not carelessly rotated by the vibration and the impact. Accordingly, the indication of the usage state of the photo film cartridge 4 is prevented from being changed.

Figure 20:
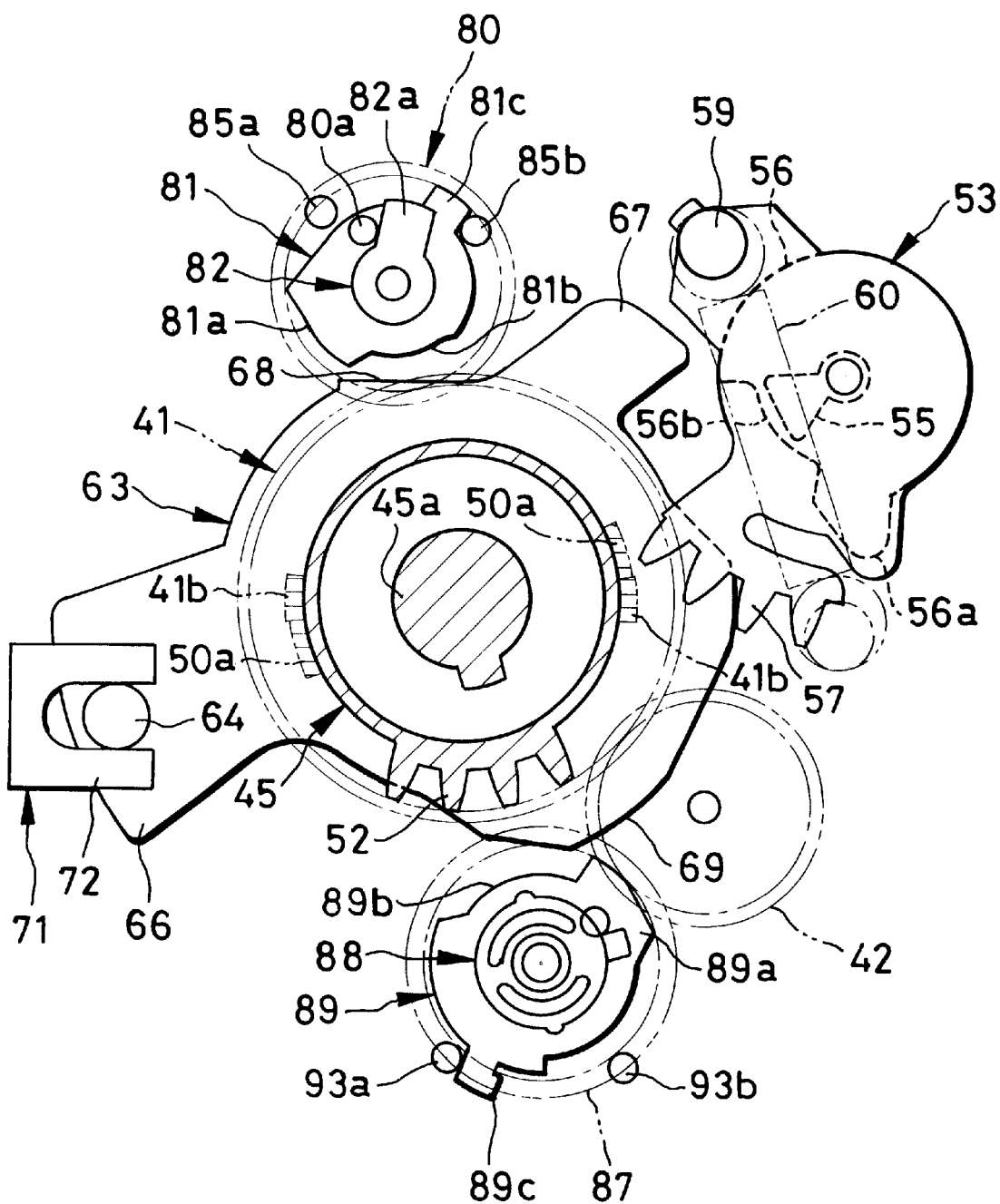
FIG. 20 is a plan view showing the safety lock mechanism according to the other embodiment.

FIG. 20 shows the safety lock mechanism according to this embodiment. An operation of the safety lock mechanism in this embodiment is basically similar to that of the first embodiment.

In this embodiment, identifying the spool position and controlling the stop position of the spool are performed by reading the data disk of the photo film cartridge with the bar code reader. However, an exclusive sensor for detecting the spool position may be provided to control the stop position of the spool.

In this embodiment, the spool driving member and the drive gear are coaxially disposed. Moreover, the drive gear is rotatably attached to the roof plate, and the spool driving member is rotatably attached to the cartridge chamber. However, the drive gear may be disposed on the upper face of the cartridge chamber together with the spool driving member. In this case, it is preferable to change heights of bosses for rotatably supporting the spool driving member and the drive gear so as not to put the spool driving member into contact with the drive gear except the engagement region.

As described above, in this embodiment, the drive gear and the spool driving member are individually and rotatably held, and are kept in the non-contact state while the drive gear is rotated by the predetermined angle. Thus, the lock of the cartridge-chamber lid may be released without changing the indication of the usage state of the photo film cartridge.

Moreover, the spool driving member is coaxially disposed under the drive gear, and the bottom of the drive gear is held by the press plate fixed to the camera body, and the bottom of the spool driving member is held by the boss formed on the upper face of the cartridge chamber. Thus, the structure is simplified.

Further, a part of the press plate is bent downward to press the top end thereof against the upper face of the spool driving member. Thus, the spool driving member is prevented from being carelessly rotated by the vibration and the impact.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a cartridge chamber for containing a film cartridge, a cartridge-chamber lid for opening and closing said cartridge chamber, a lid operation mechanism for making said cartridge-chamber lid operatable, and a film conveying mechanism for winding up and rewinding a photo film, said lid operation mechanism being changed by external handling from a retaining state for keeping said cartridge-chamber lid in a closed position, to a release state for releasing from keeping said cartridge-chamber lid, said film conveying mechanism including a motor and a transmission system, said motor rotating in a first direction for winding up said photo film and rotating in a second direction for rewinding said photo film, and said transmission system transmitting the rotation of said motor to a spool of said film cartridge, said camera comprising:

a winding-up lock mechanism for keeping said lid operation mechanism in said retaining state after being driven by a predetermined amount from when said film conveying mechanism has started to wind up said photo film, said winding-up lock mechanism making said lid operation mechanism changeable to said release state after being driven by a predetermined amount from when said film conveying mechanism has started to rewind said photo film;

a rewinding lock mechanism for keeping said lid operation mechanism in said retaining state after being driven by a predetermined amount from when said film conveying mechanism has started to rewind said photo film, said rewinding lock mechanism making said lid operation mechanism changeable to said release state after said film conveying mechanism has started to wind up said photo film; and a controller for rotating said motor in said first direction within said predetermined amount after said photo film has been completely rewound into said film cartridge by rotating said motor in said second direction, upon rotation of said motor in said first direction, both of said winding-up lock mechanism and said rewinding lock mechanism making said lid operation mechanism changeable to said release state so that said cartridge-chamber lid is opened to permit removal of said film cartridge;

wherein the winding-up lock mechanism and the rewinding lock mechanism are constructed so that during a transition by the film conveying mechanism from film wind-up to film rewind, the lid operation mechanism is maintained in the retaining state during an entire said transition.

2. A camera according to claim 1, wherein said lid operation mechanism comprises:
   an external operation member being slidable from a first position to a second position;
   an engagement lever moved by sliding said external operation member;
   a lock structure formed on said engagement lever and for engaging with a part of said cartridge-chamber lid, said lid operation mechanism being set to said retaining state when said external operation member is located at said first position, and said lid operation mechanism being set to said release state when said external operation member is located at said second position; and
   an intermediate lever coupled to said engagement lever and for regulating the slide of said external operation member via said engagement lever in accordance with said winding-up lock mechanism and said rewinding lock mechanism.

3. A camera according to claim 2, wherein said winding-up lock mechanism is rotated in association with said film conveying mechanism, said winding-up lock mechanism comprising:
   a wind-up rotational member rotating in different directions relative to film winding-up and film rewinding; and
   a wind-up lock member being movable between a lock position and a lock releasing position, at said lock position, said wind-up lock member entering a locus of said intermediate lever in association with the rotation of said wind-up rotational member in one direction to keep said lid operation mechanism in said retaining state, and at said lock releasing position, said wind-up lock member being evacuated from said locus of said intermediate lever in association with the rotation of said wind-up rotational member in the other direction to make said lid operation mechanism changeable to said release state.

4. A camera according to claim 3, wherein said rewinding lock mechanism is rotated in association with said film conveying mechanism, said rewinding lock mechanism comprising:
   a rewind rotational member rotating in different directions relative to film winding-up and film rewinding; and
   a rewind lock member being movable between a lock position and a lock releasing position, at said lock position, said rewind lock member entering a locus of said intermediate lever in association with the rotation of said rewind rotational member in one direction to keep said lid operation mechanism in said retaining state, and at said lock releasing position, said rewind lock member being evacuated from said locus of said intermediate lever in association with the rotation of said rewind rotational member in the other direction to make said lid operation mechanism changeable to said release state.

5. A camera having a cartridge chamber for containing a film cartridge, a cartridge-chamber lid for opening and closing said cartridge chamber, a lid operation mechanism for making said cartridge-chamber lid operatable, and a film conveying mechanism for winding up and rewinding a photo film, said lid operation mechanism being changed by external handling from a retaining state for keeping said cartridge-chamber lid in a closed position, to a release state for releasing from keeping said cartridge-chamber lid, said film conveying mechanism including a motor and a transmission system, said motor rotating in a first direction for winding up said photo film and rotating in a second direction for rewinding said photo film, and said transmission system transmitting the rotation of said motor to a spool of said film cartridge, said camera comprising:
   a winding-up lock mechanism for keeping said lid operation mechanism in said retaining state after being driven by a predetermined amount from when said film conveying mechanism has started to wind up said photo film, said winding-up lock mechanism making said lid operation mechanism changeable to said release state after being driven by a predetermined amount from when said film conveying mechanism has started to rewind said photo film;
   a rewinding lock mechanism for keeping said lid operation mechanism in said retaining state after being driven by a predetermined amount from when said film conveying mechanism has started to rewind said photo film, said rewinding lock mechanism making said lid operation mechanism changeable to said release state after said film conveying mechanism has started to wind up said photo film; and
   a controller for rotating said motor in said first direction within said predetermined amount after said photo film has been completely rewound into said film cartridge by rotating said motor in said second direction, upon rotation of said motor in said first direction, both of said winding-up lock mechanism and said rewinding lock mechanism making said lid operation mechanism changeable to said release state so that said cartridge-chamber lid is opened to permit removal of said film cartridge;
   wherein said lid operation mechanism comprises:
      an external operation member being slidable from a first position to a second position;
      an engagement lever moved by sliding said external operation member;
      a lock structure formed on said engagement lever and for engaging with a part of said cartridge-chamber lid, said lid operation mechanism being set to said retaining state when said external operation member is located at said first position, and said lid operation mechanism being set to said release state when said external operation member is located at said second position; and
      an intermediate lever coupled to said engagement lever and for regulating the slide of said external operation member via said engagement lever in accordance with said winding-up lock mechanism and said rewinding lock mechanism;
   wherein said winding-up lock mechanism is rotated in association with said film conveying mechanism, said winding-up lock mechanism comprising:
      a wind-up rotational member rotating in different directions relative to film winding-up and film rewinding; and
      a wind-up lock member being movable between a wind-up lock position and a wind-up lock releasing position, at said wind-up lock position, said wind-up lock member entering a locus of said intermediate lever in association with the rotation of said wind-up rotational member in one direction to keep said lid operation mechanism in said retaining state, and at said wind-up lock releasing position, said wind-up lock member being evacuated from said locus of said intermediate lever in association with the rotation of said wind-up rotational member in the other direction to make said lid operation mechanism changeable to said release state;

wherein said rewinding lock mechanism is rotated in association with said film conveying mechanism, said rewinding lock mechanism comprising:

a rewind rotational member rotating in different directions relative to film winding-up and film rewinding; and a rewind lock member being movable between a rewind lock position and a rewind lock releasing position, at said rewind lock position, said rewind lock member entering a locus of said intermediate lever in association with the rotation of said rewind rotational member in one direction to keep said lid operation mechanism in said retaining state, and at said rewind lock releasing position, said rewind lock member being evacuated from said locus of said intermediate lever in association with the rotation of said rewind rotational member in the other direction to make said lid operation mechanism changeable to said release state; and wherein an engaging portion provided on said rewind rotational member engages with an engaged portion provided on said rewind lock member after passing through a prescribed play region to associate said rotational member and said rewind lock member.

6. A camera according to claim 5, wherein said rewinding lock mechanism further comprises:

a releasing spring for urging said rewind lock member toward said rewind lock releasing state when said film conveying mechanism starts to wind up said photo film.

7. A camera according to claim 1, wherein said transmission system comprises:

a delay mechanism for transmitting the rotation of said motor to said spool in delay just after the rotation of said motor has changed from said second direction to said first direction.

8. A camera according to claim 7, wherein said delay mechanism comprises:

a drive gear rotating in a forward direction when said motor rotates in said first direction, and rotating in a backward direction when said motor rotates in said second rotation;

a spool driving member for rotating said spool;

engagement portions provided on said spool driving member and said drive gear to rotate said spool driving member with said drive gear, said engagement portions being disposed such that said drive gear engages with said spool driving member after rotating in either direction by a fixed angle within one rotation.

9. A camera according to claim 8, wherein said motor is stopped to rotate after the rotation has been changed to said first direction and before said drive gear is rotated by said fixed angle, in order to prevent said spool driving member from rotating.

10. A camera according to claim 9, wherein said drive gear and said spool driving member are separated in a vertical direction, and in a non-engagement state, said spool driving member is prevented from being rotated by a frictional force between said drive gear and said spool driving member in association with the rotation of said drive gear.

11. A camera according to claim 10, said camera further comprising:

a press plate for pressing said spool driving member so as to prevent said spool driving member from freely moving.

12. A camera comprising:

a drive gear rotating in a forward direction when a motor is rotated in a film winding-up direction, and rotating in a backward direction when said motor is rotated in a film rewinding direction;

a spool driving member for rotating a spool of a film cartridge;

engagement portions provided on said spool driving member and said drive gear to rotate said spool driving member with said drive gear, said engagement portions engaging with said spool driving member after rotating in either direction by a fixed angle within one rotation;

a usage-state setting mechanism for successively rotating said motor in a rewinding direction after a photo film has been rewound, said usage-state setting mechanism moving an indication plate, which is integrally rotated with said spool in said film cartridge, to a position corresponding to a usage state of said photo film, and said usage-state setting mechanism stopping said motor after said indication plate has been set;

a lock mechanism for locking a cartridge-chamber lid while said spool driving member is rotated in both directions, said lock mechanism releasing the locking of said lid by changing a rotational direction of said drive gear from said backward direction to said forward direction, and by stopping said drive gear after rotating it within said fixed angle, the lock mechanism maintaining locking of the lid during an entire transition from rotation of the drive gear in the forward direction to rotation of the drive gear in the backward direction; and first and second hold means for rotatably holding said drive gear and said spool driving member respectively, said hold means preventing said spool driving member from being rotated by contact between said drive gear and said spool driving gear in association with the rotation of said drive gear when said drive gear and said spool driving member do not engage with each other.

13. A camera comprising:

a drive gear rotating in a forward direction when a motor is rotated in a film winding-up direction, and rotating in a backward direction when said motor is rotated in a film rewinding direction;

a spool driving member for rotating a spool of a film cartridge;

engagement portions provided on said spool driving member and said drive gear to rotate said spool driving member with said drive gear, said engagement portions engaging with said spool driving member after rotating in either direction by a fixed angle within one rotation;

a usage-state setting mechanism for successively rotating said motor in a rewinding direction after a photo film has been rewound, said usage-state setting mechanism moving an indication plate, which is integrally rotated with said spool in said film cartridge, to a position corresponding to a usage state of said photo film, and said usage-state setting mechanism stopping said motor after said indication plate has been set;

a lock mechanism for locking a cartridge-chamber lid while said spool driving member is rotated in both directions, said lock mechanism releasing the locking of said lid by changing a rotational direction of said drive gear from said backward direction to said forward direction, and by stopping said drive gear after rotating it within said fixed angle; and first and second hold means for rotatably holding said drive gear and said spool driving member respectively, said hold means preventing said spool driving member from being rotated by contact between said drive gear and said spool driving gear in association with the rotation of said drive gear when said drive gear and said spool driving member do not engage with each other;

wherein said drive gear and said spool driving member are separated in a vertical direction, and said first hold means holds the bottom of said drive gear, and said second hold means is formed on an outer-upper face of said cartridge chamber to hold the bottom of said spool driving member.

14. A camera according to claim 13, said camera further comprising:

a press plate for pressing said spool driving member so as to prevent said spool driving member from freely moving.

15. A camera according to claim 14, wherein said press plate is fixed to a camera body and holds the bottom of said drive gear as a part of said first hold means, and a portion of said press plate bent downward presses an upper face of said spool driving member.

16. A camera according to claim 15, wherein said press plate is fixed to said camera body by a screw.

17. A camera having a film cartridge chamber, a cartridge-chamber lid, a manual lid release, and a film conveying mechanism for advancing and rewinding a photo film, said film conveying mechanism including a motor and a transmission system, said motor rotating in a first direction for advancing said photo film and rotating in a second direction for rewinding said photo film, and said transmission system transmitting the rotation of said motor to a spool of said film cartridge, said camera comprising:

an advance lock mechanism for disabling the manual lid release during said photo film advancing and enabling the manual lid release during said photo film rewinding; and a rewind lock mechanism for disabling the manual lid release during said photo film rewinding and enabling the manual lid release during said photo film advancing;

wherein the advance lock mechanism and the rewind lock mechanism are constructed so that during an entirety of an advance-to-rewind transition by the film conveying mechanism, the manual lid release is disabled by at least one of the advance lock mechanism and the rewind lock mechanism.

18. The camera of claim 17, wherein the advance lock mechanism and the rewind lock mechanism are constructed so that during a rewind-to-advance transition by the film conveying mechanism, for a predetermined amount of rotation of the motor in the first direction while advancing, the manual lid release is enabled by both the advance lock mechanism and the rewind lock mechanism.

\* \* \* \* \*